US011064378B2

(12) United States Patent
Svedman et al.

(10) Patent No.: US 11,064,378 B2
(45) Date of Patent: Jul. 13, 2021

(54) MEASUREMENT-BASED RANDOM ACCESS CONFIGURATION

(71) Applicants: ZTE Wistron Telecom AB, Kista (SE); ZTE (TX) INC., Austin, TX (US)

(72) Inventors: Patrick Svedman, Kista (SE); Jan Johansson, Kista (SE); Yonghong Gao, Kista (SE); Aijun Cao, Kista (SE); Thorsten Schier, Kista (SE); Bojidar Hadjiski, Kista (SE)

(73) Assignees: ZTE WISTRON TELECOM AB, Kista (SE); ZTE (TX) INC., Austin, TX (US)

( * ) Notice: Subject to any disclaimer, the term of this patent is extended or adjusted under 35 U.S.C. 154(b) by 140 days.

(21) Appl. No.: 15/744,293

(22) PCT Filed: Jul. 15, 2016

(86) PCT No.: PCT/US2016/042643
§ 371 (c)(1),
(2) Date: Jan. 12, 2018

(87) PCT Pub. No.: WO2017/011802
PCT Pub. Date: Jan. 19, 2017

(65) Prior Publication Data
US 2018/0359653 A1  Dec. 13, 2018

Related U.S. Application Data

(60) Provisional application No. 62/193,450, filed on Jul. 16, 2015, provisional application No. 62/307,246, filed on Mar. 11, 2016.

(51) Int. Cl.
*H04L 12/26* (2006.01)
*H04W 24/10* (2009.01)
(Continued)

(52) U.S. Cl.
CPC ............ *H04W 24/10* (2013.01); *H04B 7/026* (2013.01); *H04L 5/0035* (2013.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 6,992,998 B1 *  1/2006  Bhatoolaul ........... H04L 1/1671
                                                370/329
10,111,150 B2 * 10/2018  Van Lieshout ... H04W 36/0088
(Continued)

FOREIGN PATENT DOCUMENTS

EP    2285168 A2   2/2011
WO  2016/130827 A1   8/2016

OTHER PUBLICATIONS

Extended European Search Report dated Feb. 14, 2019, in corresponding EP Patent Application No. 16825286.4.

*Primary Examiner* — Siren Wei
(74) *Attorney, Agent, or Firm* — Duane Morris LLP

(57) ABSTRACT

A method includes: receiving one or more synchronization signals; deriving a synchronization reference from the one or more synchronization signals; receiving a plurality of reference signals; based on the derived synchronization reference, performing a plurality of measurements on the plurality of reference signals; based on the plurality of measurements, selecting a plurality of random access resources; and selecting a random access resource from the plurality of random access resources for transmitting a random access signal to at least one of the one or more TP's.

14 Claims, 9 Drawing Sheets

(51) Int. Cl.
  *H04W 56/00* (2009.01)
  *H04W 74/08* (2009.01)
  *H04L 5/00* (2006.01)
  *H04B 7/026* (2017.01)
  *H04W 48/16* (2009.01)

(52) U.S. Cl.
  CPC .......... *H04L 5/0048* (2013.01); *H04L 5/0053* (2013.01); *H04W 56/0015* (2013.01); *H04W 74/0833* (2013.01); *H04L 5/0044* (2013.01); *H04W 48/16* (2013.01)

(56) References Cited

U.S. PATENT DOCUMENTS

| | | | |
|---|---|---|---|
| 2006/0135164 A1* | 6/2006 | Kim | H04W 72/048 455/436 |
| 2010/0150085 A1 | 6/2010 | Ishii et al. | |
| 2012/0027108 A1 | 2/2012 | Hong et al. | |
| 2012/0213261 A1* | 8/2012 | Sayana | H04L 5/0094 375/224 |
| 2012/0320842 A1 | 12/2012 | Jeong et al. | |
| 2013/0286965 A1 | 10/2013 | Xu | |
| 2013/0301565 A1 | 11/2013 | Xu | |
| 2013/0322277 A1 | 12/2013 | Vanganuru et al. | |
| 2014/0112243 A1 | 4/2014 | Suzuki et al. | |
| 2015/0146631 A1 | 5/2015 | Kim et al. | |
| 2015/0245269 A1* | 8/2015 | Shao | H04W 36/0083 370/332 |
| 2015/0382205 A1* | 12/2015 | Lee | H04L 5/0048 370/329 |
| 2016/0270058 A1* | 9/2016 | Furuskog | H04W 72/0413 |
| 2017/0331535 A1* | 11/2017 | Wei | H04B 7/0478 |

* cited by examiner

MEASUREMENT-BASED RANDOM ACCESS CONFIGURATION

FIELD OF THE INVENTION

The present invention relates generally to cellular telecommunication systems, and in particular to systems and methods for performing a random access based on measurements of one or more reference signals.

BACKGROUND OF THE INVENTION

In many wireless communication systems, a network communicates with mobile devices (henceforth devices). In Long Term Evolution (LTE), for example, devices are usually called user equipments (UE's). The network transmits and receives wireless signals through transmission points (TP's). In traditional cellular wireless communication systems, different TPs are often associated with different cells, wherein a TP typically refers to the antenna system of a base station, e.g., a macro or a pico base station. In some cellular wireless communication systems, several different TP's are associated with the same cell, for example when the TP's are remote radio units (RRU's) connected to a base station, when the TP's constitute a distributed antenna system (DAS) or when some TP's act as relays. Different TP's are typically not co-located but this expression refers primarily to the TP antenna systems, since other capabilities, such as baseband processing, may be co-located. Data is typically transmitted between a TP and UE using one communication carrier, i.e., a carrier center frequency and bandwidth within which the wireless signals are transmitted. A TP often supports simultaneous communication on multiple different carriers. In such cases it is natural that a TP is associated with different cells on different carriers. In some wireless communication systems, devices may act as TP's, for instance as relays. In this role, the device may assist other devices to access the network.

SUMMARY OF THE INVENTION

The invention addresses the above and other needs by providing a method for a device to communicate with one or more transmission points (TP's). In one embodiment, the method includes: receiving one or more synchronization signals; deriving a synchronization reference from the one or more synchronization signals; receiving a plurality of reference signals; based on the derived synchronization reference, performing a plurality of measurements on the plurality of reference signals; based on the plurality of measurements, selecting a plurality of random access resources; and selecting a random access resource from the plurality of random access resources for transmitting a random access signal to at least one of the one or more TP's.

In accordance with various embodiment, the invention provides another method for a device to communicate with a transmission point (TP). The method includes: receiving one or more synchronization signals from the TP; deriving a synchronization reference from the one or more synchronization signals; receiving a plurality of reference signals from the TP; based on the derived synchronization reference, performing a plurality of measurements on the plurality of reference signals; based on the plurality of measurements, selecting a plurality of random access resources; and selecting a random access resource from the plurality of random access resources for transmitting a random access signal to the TP.

In accordance with various embodiment, the invention provides a method for a transmission point (TP) to adjust an amount of random access resources. The method includes: transmitting a synchronization signal to one or more devices; transmitting one or more reference signals to the one or more devices, wherein each reference signal is associated with a set of random access resources of the TP; receiving one or more random access signals from the one or more devices, wherein each of the one or more random access signals is correspondent with at least one of the sets of the random access resources; and based on the one or more random access signals, adjusting a transmission power of at least one of the reference signals.

In accordance with various embodiment, the invention provides a device that is configured to communicate with one or more transmission points (TP's). The device includes at least one processor configured to: receive one or more synchronization signals; derive a synchronization reference from the one or more synchronization signals; receive a plurality of reference signals; based on the derived synchronization reference, perform a plurality of measurements on the plurality of reference signals; based on the plurality of measurements, select a plurality of random access resources; and select a random access resource from a plurality of random access resources for transmitting a random access signal to at least one of the one or more TP's.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

In a wireless communication system, such as LTE and/or Universal Mobile Telecommunications System (UMTS), in some embodiments, device(s) follow the procedure described below when the device(s) initially access a network. LTE and UMTS are used as examples below, within parentheses. First, the procedure for a device to access a network (e.g., a random access) is described as a flow chart 100 of FIG. 1. Following the description of the procedure, a variety of terms used in the procedure (e.g., synchronization, measurement, and system information) are discussed in further detail. Subsequently, the random access is discussed.

Figure 1:
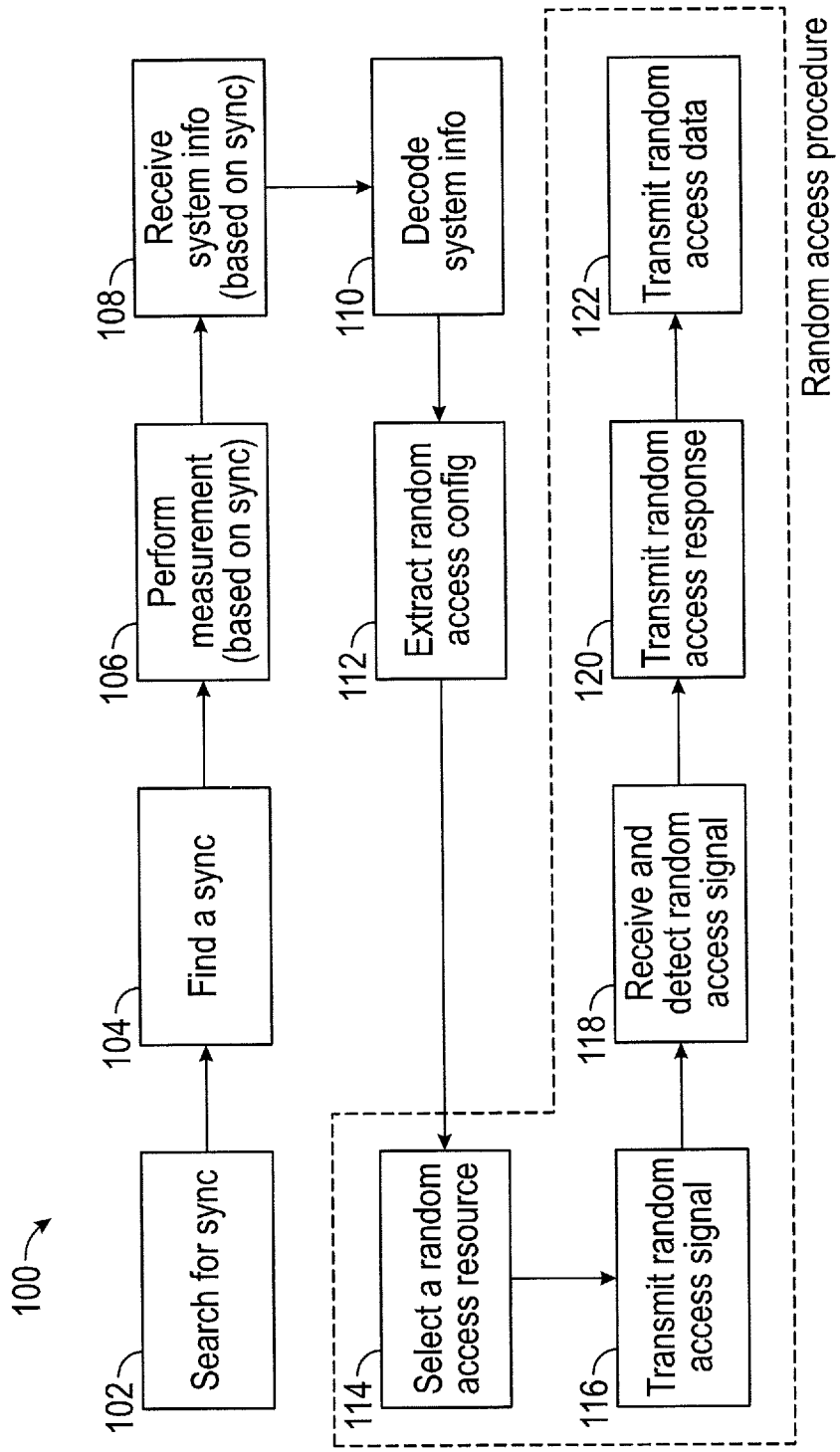
FIG. 1 illustrates a flow chart of a procedure for a device to access a network, in accordance with one embodiment of the present invention.

Referring now to FIG. 1, the procedure 100 starts at operation 102 in which the device searches for one or more synchronization signals, e.g., in the time, frequency, code, spatial and/or other domains. In some embodiments, the one or more synchronization signals may be transmitted by one or more TP's, which will be discussed in further detail below. In LTE, for example, UEs initially search for the primary synchronization signals (PSS) and secondary synchronization signals (SSS). In some LTE UE embodiments, UE's also include cell-specific reference signals (CRS) in the set of synchronization signals. In some embodiments, the device may initially search for one or more System Signature Indices (SSI), which may be a synchronization signal.

The procedure 100 continues to operation 104 in which the device detects one or more synchronization signals. More specifically, as a part of a detection procedure, the device may estimate the received power or signal quality of the synchronization signals. Such estimates may aid the device in the detection decision. In some embodiments, the device may estimate, detect, or determine other properties of one or more detected synchronization signals, for example, a sequence used for a synchronization signal or a combination of sequences used for multiple synchronization signals. Such properties may be used in the detection procedure, or may be an output of the detection procedure. In LTE embodiments, for example, the UE may determine the combination of sequences used for PSS and SSS, which represents the physical cell identity (PCI) of the cell that uses the detected PSS/SSS. In the example of the synchronization signal including SSI, in some embodiments, the device may determine an index of the SSI at the operation 104.

In some embodiments, more specifically in the synchronization signal, one or more detected synchronization signals provide the device with a reference in time, a reference in frequency, a reference in code, a reference in space, a reference in power, a reference in other dimension(s), or a combination thereof, henceforth denoted a "sync reference". In some embodiments, such a sync reference may include a reference parameter that can be later used to perform one or more measurements on reference signal(s) (e.g., a measurement RS which will be described below). In some embodiments, the sync reference is also used as a reference while transmitting a random access signal and/or receiving a random access response signal (which will be described below). A sync reference may be rough in some cases, e.g., not sufficiently accurate for high-rate (e.g. low redundancy) data reception with high performance (e.g. low decoding error rate). A sync reference may be fine in other cases, e.g., sufficient for high-rate data rate data reception with high performance. In LTE, for example, a synchronization based only on PSS/SSS may be considered rough. On the other hand, if CRS are used to refine the synchronization, the sync reference may be fine. However, note that the synchronization accuracy is not a binary (e.g. rough or fine) concept in general, but rather continuous from completely inaccurate to ideal. Also note that the required level of synchronization accuracy depends on the communication scheme, e.g., the used signal waveforms. In some embodiments, one or more detected synchronization signals are used to obtain a sync reference. In some embodiments, multiple synchronization signals are used to obtain multiple sync references. (In LTE or other embodiments, for example, one set of PSS, SSS and CRS may be used to obtain a sync reference and another set of PSS, SSS and CRS may be used to obtain another sync reference.) In some embodiments, different SSI's may be used to obtain different sync references.

The procedure 100 continues to operation 106 in which the device performs multiple measurements on multiple measurement RS's based on the sync reference. Each of the measurements is performed on a reference signal (RS), here called a measurement RS. In some cases, the measurement RS is also part of the synchronization signal(s), whereas in other cases it is not. The time, frequency, code and/or space properties of the measurement RS are derived from the sync reference. In some embodiments, the device may derive the time location of the measurement RS by adding a known offset to the timing of the sync reference. If a device has obtained multiple sync references, it may perform multiple measurements on multiple measurement RS's for each sync reference. In some embodiments, the device performs a measurement for each measurement RS. In some embodiments, the device performs a measurement using multiple measurement RS's. Further, the output from a measurement is one or more measurement results. Continuing with the example that the synchronization signal including SSI(s), in some embodiments, the device may detect multiple SSI's and perform multiple measurements on the multiple SSI's. A measurement on an SSI may be based on the sync reference provided by the SSI. In some embodiments, the device may continuously perform the measurements after the operation 106. For example, the device may remain performing the measurements through the operations 108, 110, and 112, and/or through the operations 114, 116, 118, and 120. Details of the operations 108-120 will be discussed in further detail below.

A "measurement" results in (i.e. yields) a measurement result. A measurement result is used outside the measurement itself. In one example, it is sent to another node. In LTE, for example, a UE sends an reference signal received power (RSRP) measurement to the serving eNodeB. In another example, the measurement result is evaluated and if the measurement result fulfills some criterion, an action is taken, for example it is sent to another node in some embodiments. In LTE, for example, a UE evaluates if an RSRP measurement result exceeds a threshold. If so, it is sent to the serving eNodeB in some embodiments. In some embodiments, multiple measurement results are compared, and an action is taken as a result of the comparison. In LTE, for example, a UE compares the RSRP measurement for the serving cell with another RSRP measurement on a neighbor cell. If the neighbor cell RSRP is high enough compared to the serving cell RSRP, the neighbor cell RSRP is sent to the serving cell according to various embodiments.

A measurement may use multiple instances of a signal and perform averaging, for example, to get the measurement result, where the multiple instances can be separated by time, frequency or code, for example. A measurement can also be done using different kinds of signals, as long the outcome is a measurement result. In some embodiments, a measurement can be done using different signals corresponding to different antennas or antenna ports, and with the measurement result corresponding to a multi-antenna transmission or an assumed multi-antenna transmission. In some embodiments, a signal that is transmitted repeatedly, e.g., periodically, is continuously measured/monitored. In such cases, it is common to include previous measurement results into the computation of new measurement results. Still, the new measurement result can be seen as the output of a new measurement. In some LTE embodiments, for example, CRS are transmitted periodically. A UE that continuously monitors CRS-based RSRP may obtain a new measurement result after each CRS transmission in various embodiments, even though the new RSRP is partly based on the previously obtained RSRP.

In some embodiments, intermediate measurement values, e.g., within an averaging process, that are not used outside the measurement itself are not considered individual measurement results. Consequently, the set of actions that result in such an intermediate measurement value is not considered an individual measurement in such embodiments. However, in some embodiments multiple measurements can be performed on the same signal, if the different measurements output individual measurement results. In LTE, for example, multiple different measurement results can be obtained from the same CRS, e.g., RSRP, RSRQ or a frequency offset.

Referring back to FIG. 1, the procedure 100 continues to operation 108 in which the device receives, from the one or more TP's, one or more signals containing system information, based on the sync reference, in accordance with various embodiments. In the example of LTE, the UE receives system information over both physical broadcast channel (PBCH) and physical downlink shared channel (PDSCH), using the sync reference of the cell. More specifically in the operation 108, if a device has obtained multiple sync references, and subsequently obtained multiple corresponding measurement results, as described above (operation 106), the device may use one or more of those sync references to receive one or more separate pieces of system information. In the same example of LTE, a UE may detect multiple cells with separate sync references, i.e., different timing, carrier frequency, cell-id, etc. Then the UE may choose one or more of those cells, e.g., based on the measurement result from the operation 106, from which to receive system information. In some embodiments, continuing with the SSI example described above, the device may receive one or more signals containing system information, which may include a common access information table (C-AIT), based on a sync reference. Then, it may choose an entry in the table (typically containing system information), e.g., based on measurement results from the operation 106. For example, the index of the SSI with the highest measured RSRP may be used to select an entry.

In some embodiments, the procedure 100 continues to optional operation 110 in which the device decodes the received signal to obtain the system information, if the system information is encoded with channel coding (e.g., forward error correction (FEC)). More specifically, in some embodiments, if a device receives multiple pieces of system information based on multiple sync references, the device may separately decode the multiple pieces of system information. In the example of LTE, the UE may decode system information from multiple different cells. The system information may include various system parameters and configurations etc., in accordance with various embodiments. Details of the system information will be described in further detail at the following operation 112.

The procedure 100 continues to operation 112 in which the device derives (extracts) one or more random access configuration from the system information, in accordance with various embodiments. In some embodiments, the system information includes random access configuration. Generally, the random access configuration provides instruction(s) to the device on how the device may perform a random access. The random access configuration typically includes information of a set of allowed random access resources that the device may use to transmit a random access signal. A random access resource is a combination of, for example, time, frequency, space, code/sequence and/or power resources. The random access resources are at least partly (e.g. time and frequency) defined in relation to the sync reference. In the example of LTE, the random access configuration is defined for each cell, which also has its own sync reference. The set of allowed random access resources is defined by a set of resource blocks (RB's) in time and frequency and a set of allowed preamble sequences. In the example of SSI, a C-AIT is a table included in a piece of system information. An entry in the table corresponds to an SSI. An entry in the table includes a random access configuration, in which the set of allowed random access resources are defined in relation to the sync reference provided by the SSI corresponding to the entry.

In some embodiments, the random access configuration further includes information on a mapping between the multiple measurement results (as described at the operation 106) and a set of allowed random access resources that the device may use to transmit a random access signal. In some embodiments, such a mapping may be referred to as a random access mapping.

Referring still to the operation 112 of FIG. 1, in some embodiments, if a device has obtained multiple sync references and successfully decoded multiple corresponding pieces of system information, the device may have obtained multiple different random access configurations. In various embodiments, some or all of such multiple different random access configurations include random access mappings, which may be different from or identical to one another. The device may then use the random access mapping for the corresponding sync reference in relation to which the device will attempt a random access. In the example of SSI, an AIT may contain multiple entries, i.e. an AIT contains multiple different sets of random access resources, defined in relation to the corresponding sync reference (of the SSI).

Referring still to the operation 112 of FIG. 1, in some embodiments, the system information does not include information about the random access mapping. In such embodiments, the random access mapping may be specified in the communication standard, (i.e. being known beforehand). In some embodiments, the TP's (and the network) know the random access mapping(s) that the devices use. In some embodiments, the TP's (and the network) know some parts or aspects of the random access mapping(s) that the devices use, while other parts or details are not known.

Referring still to the operation 112 of FIG. 1, in some embodiments, the system information contains a configuration of the measurement RS's. As such, the configuration may include a number of measurement RS's, a bandwidth used by a measurement RS, a combined bandwidth used by multiple measurement RS, a time-multiplexing pattern, (e.g. period and time-offset), used by measurement RS's (e.g., time-multiplexed in bursts as described with respect to FIG. 4), or a combination thereof.

In some alternative embodiments, the operation 112 may occur prior to the operation 106 when the system information includes a configuration of the measurement RS's.

Referring still to the operation 112 of FIG. 1, in some embodiments, the random access mapping takes other factors into account, in addition to measurement results. Examples of such factors include but are not limited to: a state of the device; a purpose of the random access attempt (for example, hand over, recover link failure, random access with data transmission, which will be described further with respect to operations 116 and 122, random access to request uplink scheduling grant or random access following a received paging, etc.); a type of service or the service QoS requirements for which the random access procedure is triggered. In some embodiments, the random access mapping maps multiple measurement results to multiple sets of allowed random access resources, which may be disjoint or overlapping. In some embodiments, at least some measurement results are obtained prior to system information. In some embodiments, a device can assume that system information, or a part of the system information, is present based on some measurement result(s), e.g., if the result(s) are above a certain threshold.

After obtaining sync reference(s), performing measurement(s) and/or obtaining system information, (including random access configuration(s)), a device may proceed to the random access procedure. In some embodiments, operations 114, 116, 118, and 120 of the FIG. 1 illustrates a random access procedure. Details of each of the operations 114 to 120 are described as follows.

Figure 2:
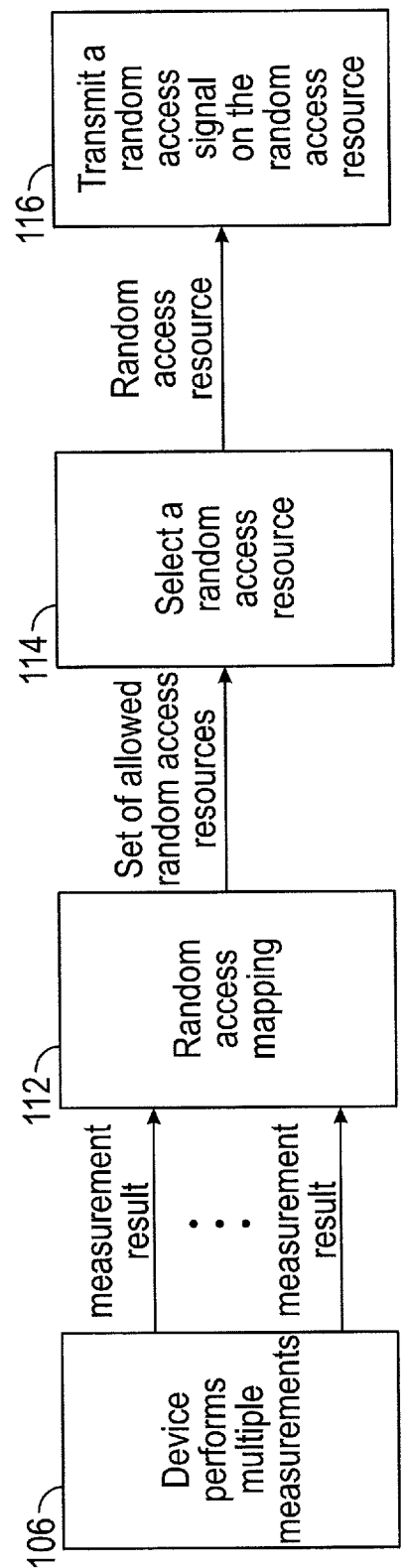
FIG. 2 illustrates part of the procedure of FIG. 1 in more detail, in accordance with one embodiment of the present invention.

Still referring to FIG. 1, the procedure 100 continues to operation 114 in which the device selects a random access resource to be used, from a set of allowed random access resources, in accordance with various embodiments. The device may select a random access resource to be used based on a variety of parameters such as, for example, time, code/sequence, measurement results (i.e., operation 106) which will be described further with respect to FIGS. 2 and 3, etc.

Regarding time, for shorter random access delay, the device may advantageously select a random access resource that follows shortly in time, in various embodiments. Regarding code/sequence, in some embodiments, the device conveys information to the random access signal receiver by the selection of the code/sequence used for the random access signal. For example, the set of possible codes/sequences may be subdivided into subsets, where the device subset selection is based on the information to be conveyed. The random access receiver is the entity intended to receive and detect the random access signal. In some embodiments, one or more TPs are used. In LTE, for example, the preamble sequences for contention-based random access are subdivided into two subsets. The subset to which the UE-selected sequence belongs indicates to the eNodeB the size of a subsequent UE message. In some other embodiments, the device may choose randomly or pseudo-randomly among the set of possible random access codes/sequences.

In some embodiments, if the device has obtained multiple random access configurations corresponding to multiple sets of allowed random access resources, the device may first select which of those sets to select from. For example, such a selection may be based on the measurement results corresponding to the different sync references, as described in the operation 106 of FIG. 1. In other embodiments, the network may decide based on which sync reference the device will perform random access. In LTE, for example, the UE may initially choose to which cell to perform random access, typically based on the measurement results. Then the UE would apply the random access configuration of that cell and select a corresponding resource. During handover, on the other hand, the serving cell decides to which cell the UE should perform random access.

Figure 3:
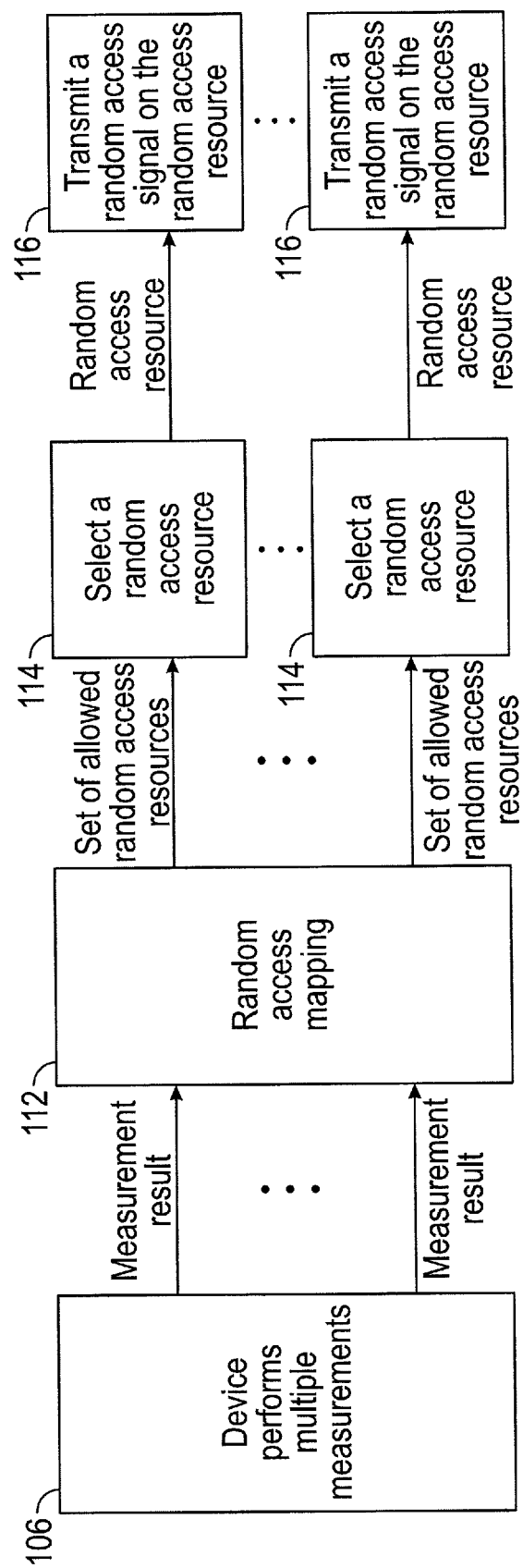
FIG. 3 illustrates part of the procedure of FIG. 1 in more detail, in accordance with another embodiment of the present invention.

As described above, in some embodiments, the selection of random access resource(s) may be based on the measurements (e.g., operation 106). More specifically, in the illustrated embodiment of FIG. 2, based on the results of the multiple measurements on the multiple measurement RS's (i.e., the operation 106) and possibly other factors, the device selects a set of allowed random access resources (i.e., the operation 114), using a random access mapping (as described at the operation 112). In some embodiments, multiple sets of allowed random access resources are selected. In the illustrated embodiment of FIG. 3, in which multiple sets of allowed random access resources are selected (i.e., multiple operations 114 as shown in FIG. 3), the operation 114 may be implemented as that the device selects a random access resource for each set of allowed random access resources, as illustrated in FIG. 3. In some embodiments of the operation 114, the device may select multiple random access resources from a single set of allowed random access resources.

Referring back to FIG. 1, the procedure 100 continues to optional operation 116 in which the device transmits a random access signal, using a selected random access resource, in accordance with various embodiments. In some embodiments, the device may also transmit data as part of or in connection with the random access signal, in addition to any information embedded in the choice of code/sequence (as described above with respect to the operation 114), before receiving a random access response (i.e., operation 120 which will be described below). The transmit power used for the random access signal may also be based on a measurement result.

In some embodiments, in which multiple random access resources are selected (as shown in FIG. 3), accordingly, the operation 116 may be implemented as that the device transmits multiple random access signals, using the selected random access resources. According to such embodiments, a device would then transmit multiple random access signals, before a response is received. In some embodiments in which multiple random access resources are separated in time, a response to an early transmitted random access signal may be received before a later random access signal is transmitted.

The procedure 100 continues to operation 118 in which the random access signal receiver receives and, in response, starts to detect random access signals on a random access resource. In some embodiments, the random access signal receiver includes the TP that provides the set(s) of allowed random access resources.

The procedure continues to operation 120 in which the random access receiver (e.g., the TP) responds to the device according to the detection at the operation 118, in accordance with various embodiments. In some embodiments, if the detection at the operation 120 is successful, the random access receiver responds to the device with a random access response. In some LTE embodiments, for example, the eNodeB responds to the UE with a random access response (RAR) message. In some UMTS embodiments, the NodeB responds with the Acquisition Indicator Channel (AICH). Other responses may be used in other embodiments. The random access response typically contains further information and configuration for the device. If data was transmitted as part of or in connection with the random access signal, the random access response may include an acknowledgement (ACK) or negative acknowledgement (NACK) of the successful decoding of this data. On the other hand, if the random access receiver does not successfully detect the random access signal, the corresponding random access response will not be received by the device, which can deduce that the random access attempt failed at some point. The device may then attempt again, in some embodiments, by selecting a completely or partly new random access resource in the operation 114, typically also with increased transmit power.

The procedure continues to operation 122 in which the device transmits data right after the reception of the random access response, in accordance with various embodiments. In some UMTS embodiments, for example, a small amount of data may be transmitted after the random access signal, following the reception of the Acquisition Indicator Channel (AICH).

The synchronization signal, the measurement RS, the measurement result, the random access resource, and the random accessing mapping mentioned at the operations 104, 106, 108, and 112, respectively, will be described in further detail below.

Figure 4:
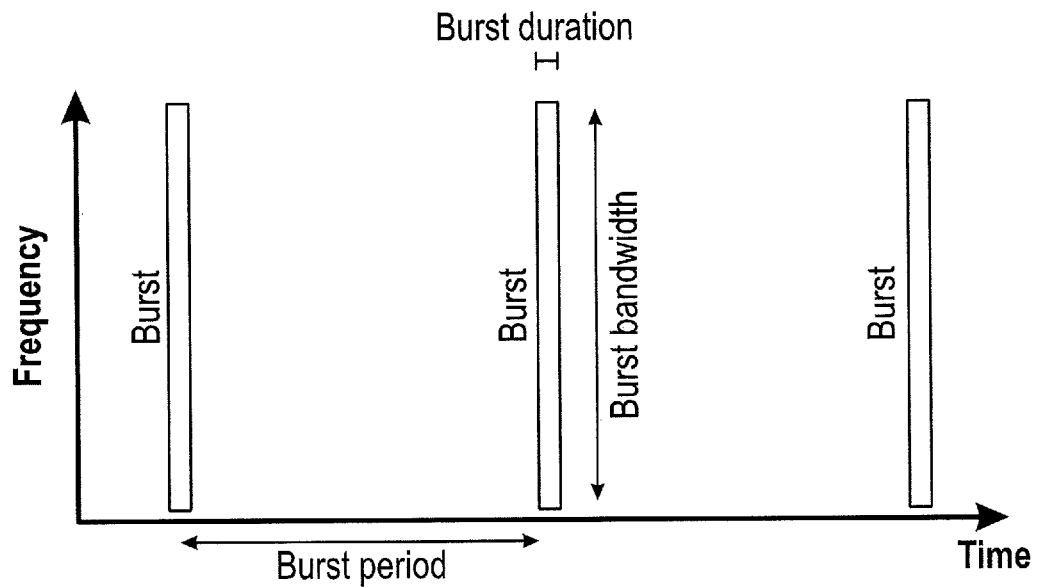
FIG. 4 illustrates an example of a periodic burst signal, in accordance with one embodiment of the invention.

Referring now to FIG. 4, an exemplary embodiment of periodically transmitted bursts is shown. More specifically in the illustrated embodiment of FIG. 4, the periodically transmitted bursts include a burst period, a burst duration, and a burst width. In some embodiments, synchronization signals and measurement RS's are transmitted in bursts (periodically). In some embodiments, the time between bursts, i.e., the burst period, in a periodic transmission, is much larger than the burst duration. In some embodiments, the burst duration is a multiple of 1 ms, e.g., between 1-5 ms. In some embodiments, the burst duration is an integer multiple of the LTE Orthogonal Frequency Division Multiplexing (OFDM) symbol duration, i.e., multiples of approximately 71.4 microseconds in some LTE configurations. In some embodiments, the burst period is 80, 100, 160 or 200 milliseconds but other durations may be used in other embodiments.

In some embodiments, the synchronization signals are the synchronization signals of LTE, i.e., PSS and SSS. In some such embodiments, the relation in time and frequency between the PSS and the SSS is as in LTE, i.e., PSS follows in the OFDM symbol after the SSS in Frequency Division Duplex (FDD) or two OFDM symbols after the SSS in Time Division Duplex (TDD). In some embodiments, PSS is used as synchronization signal, but not SSS. In some embodiments, CRS is also transmitted, in addition to PSS and/or SSS, and may be used for synchronization. As described in the operation 104 of FIG. 1, multiple synchronization signals can be used to obtain a single sync reference, such as when the PSS/SSS/CRS from a single cell are used to obtain one sync reference. Furthermore, in some embodiments, multiple synchronization signals can be used to obtain multiple sync references, such as when PSS/SSS/CRS from different (mutually unsynchronized) cells can be used to obtain multiple sync references, i.e. one sync reference corresponding to the synchronization of one cell.

Figure 5:
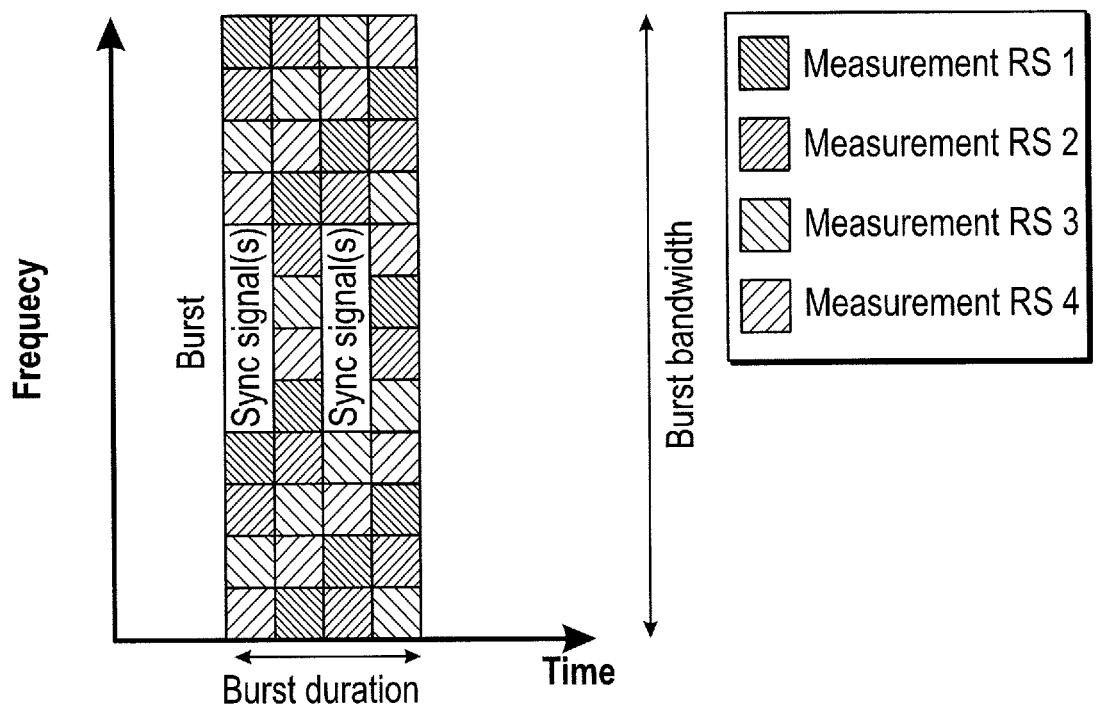
FIG. 5 illustrates an example of a burst signal that includes one or more synchronizations signals and plural measurement RS's, in accordance with one embodiment of the invention.

In various embodiments, the device performs measurements on multiple measurement RS's based on a sync reference, as described at the operation 106 of FIG. 1. In some embodiments, the multiple measurement RS's are transmitted in bursts together with synchronization signals (as shown in FIG. 5), where various burst embodiments are described above. In some embodiments, the multiple measurement RS's are transmitted only in the bursts. In some other embodiments, in addition to being transmitted inside the burst(s), the multiple measurement RS's may be transmitted outside the burst(s). In some embodiments, the multiple measurement RS's are transmitted repeatedly in each burst. In some embodiments, one or more of the multiple measurement RS's are not transmitted in each burst. In some embodiments, an individual measurement RS that is not transmitted in each burst is transmitted in every $n^{th}$ burst, where n is an integer greater than 1. In some embodiments, up to n different measurement RS's are time-multiplexed by transmitting the RS's on the same resources (except in time) in every $n^{th}$ burst, but in different bursts.

In some embodiments, the multiple measurement RS's are transmitted repeatedly in each burst. In some embodiments, one or more of the multiple measurement RS's are not transmitted in each burst. In some embodiments, an individual measurement RS that is not transmitted in each burst is transmitted in every $n^{th}$ burst, where n is an integer greater than 1. In some embodiments, up to n different measurement RS's are time-multiplexed by transmitting the RS's on the same resources (except in time) in every $n^{th}$ burst, but in different bursts.

In some embodiments, one or more parameters related to the one or more synchronization signals indicate one or more parameters related to the measurement RS's discussed below. In some embodiments, one or more sequences/codes used for the synchronization signals is used to indicate one or more parameters related to the measurement RS's. In some embodiments where PSS/SSS is used as synchronization signals, the PCI indicates one or more parameters related to the measurement RS's. In some embodiments, the relative time difference between different synchronization signals (corresponding to the same sync reference) indicates one or more parameters related to the measurement RS's. In some embodiments in which PSS/SSS are used as synchronization signals, the relative time difference between PSS and SSS may indicate one or more parameters related to the measurement RS's.

In various embodiments, the burst containing synchronization signal(s) and measurement RS's also contains basic system information, which in some embodiments include one or more parameters related to the measurement RS. In some embodiments, the basic system information is a block of channel encoded information bits modulated onto a set of sub-carriers in a multi-carrier system. In other embodiments, the bits are modulated onto single-carrier waveform(s). In some embodiments, a burst that contains broadcasted system information, or a certain piece of system information, also contains a transmission of one or more certain measurement RS's. In some embodiments, a device may assume that the system information, or a certain piece thereof, is available in the burst if measurement result(s) for the one or more measurement RS(s) in the same burst are above certain threshold(s), and where the measurement is not averaged over multiple bursts. These embodiments can be used by the network or a TP to let only a fraction of the bursts contain broadcasted system information, or certain pieces of system information. Devices would be notified by the presence of the information by the presence of a measurement RS. In some embodiments, the measurement RS(s) related to the presence of system information, or pieces of system information, may also be used to demodulate the broadcasted system information.

In some embodiments, one or more parameters related to the measurement RS are explicitly defined in a standard. In some embodiments, one or more parameters related to the measurement RS were configured specifically for the device in an earlier connection to the network. In some embodiments where a device is capable of multiple simultaneous connections, such as dual connectivity in LTE or multi-connectivity in future systems, one or more parameters related to the measurement RS are configured through an already present connection. An already present connection is on the same carrier (i.e. frequency band) as the carrier where the initial access of this disclosure occurs, in some embodiments, and on another carrier, in some embodiments.

In some embodiments, the one or more parameters related to the measurement RS's includes one or more of the following:
  the total bandwidth used for the measurement RS's,
  the frequency spacing between subcarriers[1] used for an individual measurement RS or for multiple different measurement RS's,
  the time duration for an instance of an individual measurement RS, or for multiple different measurement RS's, e.g. the duration within a burst,
  the time offset between a synchronization signal and an individual measurement RS, or multiple different measurement RS's,
  the distribution in time and/or frequency between time-symbols and/or subcarriers used for an individual measurement RS,
  the sequence or code used for an individual measurement RS, or for multiple different measurement RS's,
  the amount of resources used for an individual measurement RS, or for multiple different measurement RS's. Other parameters related to the measurement RSs are used in other embodiments.

In the above discussion of the operation 106 of FIG. 1, the device obtains one or more measurement results from the measurement on one or more measurement RS's. Various embodiments of a measurement result are listed below but other measurement results are used in other embodiments:
  Reference signal received power (RSRP)
  Reference signal received quality (RSRQ)
  Signal to interference power ratio (SINR)
  Signal to noise power ratio (SNR)
  Signal to interference power ratio (SIR)
  Expected data rate
  Expected spectral efficiency
  Expected energy efficiency
  Expected latency
  Channel estimate
  Channel quality indicator (CQI)
  Recommended, expected or supported transmission rank In various embodiments with bursts, a device may average the measurement results over multiple bursts. In some embodiments with bursts, a device may not average the measurement results over multiple bursts. In some embodiments with bursts, a device may average the measurement results over certain bursts, but not every burst.

Regarding the random access resource, in some embodiments, an allowed random access resource is a random access slot. In some embodiments, an allowed random access resource is a random access preamble. In some embodiments, an allowed random access resource is a combination of a random access slot and a random access preamble.

In some embodiments, a set of allowed random access resources is a set of random access preambles, in some embodiments a set of allowed random access resources is the set of random access preambles, and a random access slot. In some embodiments, the set of random access preambles includes all random access preambles, i.e. the selection of random access preamble is not restricted. In some embodiments, the set of random access preambles includes a sub-set of all random access preambles, i.e. the selection of random access preamble is restricted. In some embodiments, a set of allowed random access resources is a set of multiple random access slots with a set of random access preambles defined for each of these random access slots, In various embodiments, a random access slot is a continuous time-frequency range, e.g. a set of adjacent RB's in some embodiments or a set of adjacent sub-carriers and time-symbols in some embodiments. In some embodiments, there are several simultaneous, or partly simultaneous, random access slots on different frequencies. In some embodiments, the time-frequency range of two different random access slots do not overlap, whereas they partly overlap in some embodiments. In some embodiments, a random access slot occurs repeatedly in time, e.g. periodically in some embodiments.

In various embodiments, a random access preamble is a signal that may be used as a random access signal by a device. In various embodiments, there are multiple different random access preambles that may be used as random access signals. In some embodiments, a random access preamble is defined by a sequence, code and/or index, that in various embodiments are used to generate the random access preamble. In other embodiments, a random access preamble is defined through other parameters, that may be used to generate the signal.

Figure 6:
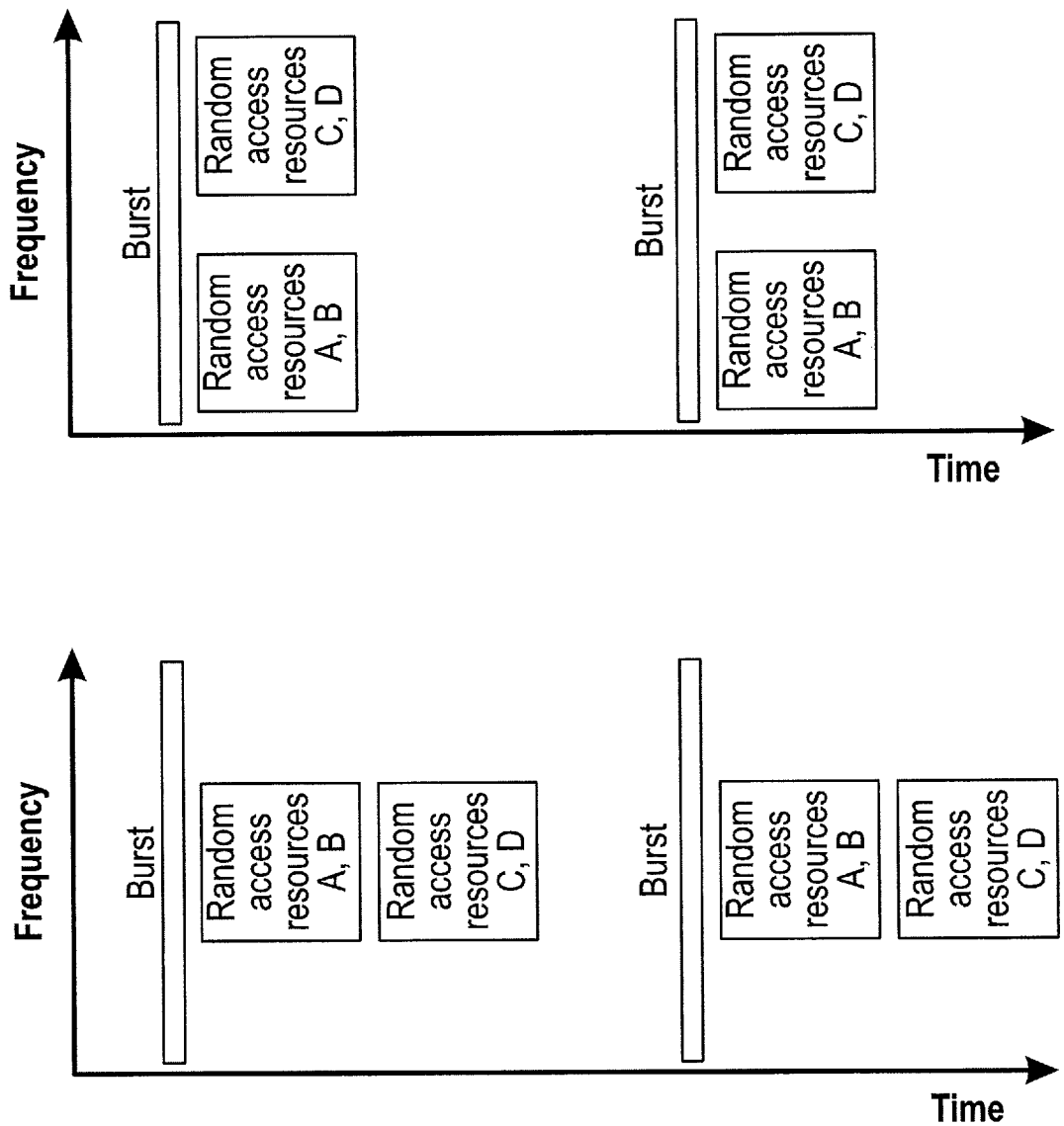
FIG. 6 illustrates two examples of four sets of allowed random access resources, in accordance with one embodiment of the invention.

FIG. 6 illustrates examples (upper and lower examples) in which random access resources following the bursts in time. In these examples, there are four sets of allowed random access resources: A, B, C, D. In these example, sets A and B share the same random access slot (time-frequency resources) and sets C and D share the same random access slot. The sets A and B can still be different if A includes one set of random access preambles while B includes another set of random access preambles. In some exemplary embodiments, the set of preambles for A is the same as for C, and the set of preambles for B is the same as for D. In some other embodiments, they differ from one another. In the upper example, the sets of allowed random access resources overlap in time. In the lower example, they overlap in frequency. The sets A, B, C and D are disjoint, since they differ in at least one of time, frequency or preambles.

Referring now to the random access mapping described with respect to the operation 112 of FIG. 1, a random access mapping defines a mapping from multiple measurement results (with various embodiments listed above) from multiple measurement RS's (with various embodiments listed above) to one or more set(s) of allowed random access resources (with various embodiments listed above).

Various embodiments of such mappings are listed below. The measurement result that is highest is used to select a set of allowed random access resources.

- In some embodiments, a measurement RS corresponds to a set of allowed random access resources. The set of allowed random access resources for the measurement RS with highest measurement result is selected.
- In some embodiments, a device obtains multiple different kinds of measurement results for a measurement RS, for example, RSRP and expected spectral efficiency. In some such embodiments, the multiple different kinds of measurement results may be combined into a combined measurement result. Then, which combined measurement result that is highest is used to select a set of allowed random access resources.
- In some embodiments, multiple measurement RS's correspond to a set of allowed random access resources, where the multiple measurement RS's are used to obtain a measurement result. In some embodiments, different sets of multiple measurement RS's correspond to different sets of allowed random access resources. The set of allowed random access resources for the multiple measurement RS's with highest measurement result is selected, in various embodiments.
- In some embodiments, a device obtains multiple different kinds of measurement results for multiple measurement RS (that correspond to a set of allowed random access resources), for example supported transmission rank and expected spectral efficiency on each supported layer. In some such embodiments, the multiple different kinds of measurement results may be combined into a combined measurement result. Then, the combined measurement result that is highest may be used to select a set of allowed random access resources.
- In some embodiments, the measurement RS with highest measured RSRP is used to select a set of allowed random access resources.
- In some embodiments, a set of allowed random access resources is selected only if the highest result is above a threshold.
- In some embodiments, one kind of measurement result is used to find the measurement RS with the highest measurement result and another kind of measurement result on the measurement RS with highest measurement result is used compare with a threshold, as above.

Figure 7:
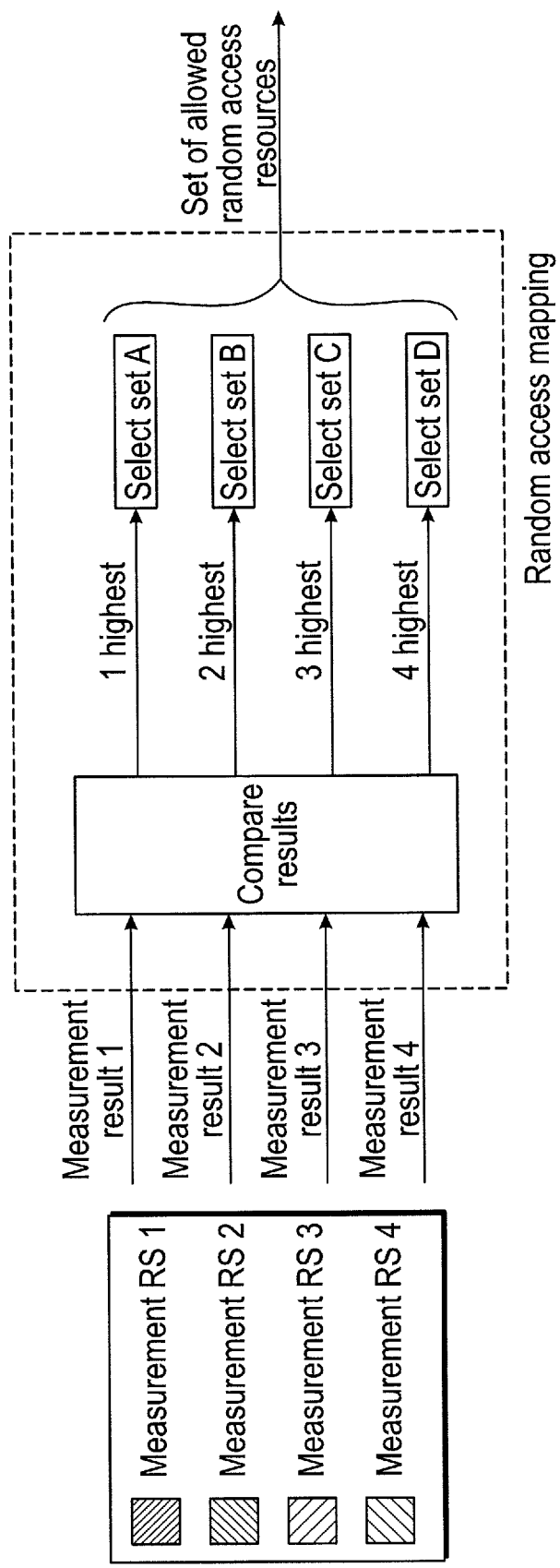
FIG. 7 illustrates an example of a random access mapping, in accordance with one embodiment of the invention.

FIG. 7 illustrates an example in which a set of allowed random access resource is selected through the random access mapping based on a comparison of multiple measurements on multiple measurement RS's. As illustrated in FIG. 7, four different measurement RS's (measurement RS's 1, 2, 3, and 4) are measured to provide measurement results 1, 2, 3, and 4, and the measurement results are compared in the random access mapping. Based on the comparison, the measurement result that is the highest is used to select a set of allowed random access resources among the allowed random access resources A, B, C, and D (as illustrated in FIG. 6).

The disclosure also covers various embodiments as described above, e.g., in the previous bullet, but with the M highest measurement results being used to select multiple (M, in some embodiments) sets of allowed random access resources, where the sets can be disjoint in some embodiments, and overlapping in some embodiments.

The measurement result(s) that are within a certain range of the highest measurement result are used to select a set of allowed random access resources in various embodiments. For example,

- In some embodiments, a measurement RS corresponds to a set of allowed random access resources. The device selects the union of the sets of allowed random access resources for the measurement RS's with measurement results within a certain range of the highest measurement result.
- In some embodiments, a device obtains multiple different kinds of measurement results for a measurement RS, for example RSRP and expected spectral efficiency. In some such embodiments, the multiple different kinds of measurement results may be combined into a combined measurement result. Then, the combined measurement result(s) that are within a certain range of the highest are used to select a set of allowed random access resources in such embodiments.
- In some embodiments, multiple measurement RS corresponds to a set of allowed random access resources, where the multiple measurement RS's are used to obtain a measurement result. In some embodiments, different sets of multiple measurement RS's correspond to different sets of allowed random access resources. In such embodiments, the device selects the union of the sets of allowed random access resources for the measurement RS's with measurement results within a certain range of the highest measurement result.
- In some embodiments, a device obtains multiple different kinds of measurement results for multiple measurement RS (that correspond to a set of allowed random access resources), for example supported transmission rank and expected spectral efficiency on each supported layer. In such embodiments, the multiple different kinds of measurement results may be combined into a combined measurement result, for example, the sum spectral efficiency over the layers. Then, the combined measurement result(s) that are within a certain range of the highest are used to select a set of allowed random access resources in such embodiments.
- In some embodiments, the measurement RS's with measured RSRP's within a certain range of the highest measured RSRP are used to select a set of allowed random access resources.
- In some embodiments, a set of allowed random access resources is selected only if the highest result is above a threshold. Various embodiments of the definition or configuration of a threshold are given below.
- In some embodiments, only measurement result(s) within a certain range of the highest measurement result that are also above a threshold are used to select a set of allowed random access resources.
- In some embodiments, one kind of measurement result is used to find the measurement RS with the highest measurement result and another kind of measurement result on the measurement RS with highest measurement result is used compare with a threshold, as above.

Various embodiments above include the use of thresholds. In some embodiments, a threshold value is explicitly defined in a standard. In some embodiments, a threshold value may be configured in broadcasted system information. In some embodiments, a threshold value was configured specifically for the device in an earlier connection to the network, for example, in an embodiment where the initial access in this disclosure is part of a handover procedure, and the device was connected to the earlier connection before the handover. In some embodiments where a device is capable of multiple simultaneous connections, such as dual connectivity in LTE or multi-connectivity in future systems, a threshold value is configured through an already present connection. An already present connection is on the same carrier (i.e. frequency band) as the carrier where the initial access.

The disclosure also provides multiple embodiments with the one or more measurements RS(s) (with measurement results that are within a certain range of the highest measurement result) being mapped to multiple sets of allowed random access resources. In some embodiments, each of those measurement RS's are mapped to a set of allowed random access resources. In some embodiments, the one or more measurement RS(s) are jointly mapped to multiple sets of allowed random access resources.

The disclosure also covers the embodiments described above, but in which the lowest measurement results are used instead of the highest.

In various embodiments, other factors are taken into account in the mapping, in addition to measurements results, as listed in various embodiments above. For example, In some embodiments, the type of service (or services) that trigger the random access is taken into account in the selection of set of allowed random access resources.

In some embodiments, the quality of service or performance requirements of the communication or service that triggered the random access is taken into account in the selection of set of allowed random access resources.

In some embodiments, the latency requirements are taken into account in the selection of set of allowed random access resources. For example, for a shorter latency, random access resources closer in time may be selected.

In some embodiments, a need to receive system information is taken into account in the selection of set of allowed random access resources.

In some embodiments, requests to receive different pieces system information correspond to different selections of sets of allowed random access resources.

In some embodiments, a random access signal transmission corresponding to a request to receive a certain piece of system information as outlined above, is followed by the requested piece of system information as a random access response, or in connection with the random access response.

Various embodiments of the definition or configuration of a random access mapping used by a device are given below. In some embodiments, a mapping is explicitly defined in a standard. In some embodiments, a mapping may be configured in broadcasted system information. In some embodiments, a mapping was configured specifically for the device in an earlier connection to the network, for example in an embodiment where the initial access in this disclosure is part of a handover procedure, and the device was connected to the earlier connection before the handover. In some embodiments where a device is capable of multiple simultaneous connections, such as dual connectivity in LTE or multi-connectivity in future systems, a mapping is configured through an already present connection. An already present connection is on the same carrier (i.e. frequency band) as the carrier where the initial access of this disclosure occurs, in some embodiments, and on another carrier, in some embodiments.

In various embodiments, a device has obtained system information, which includes an AIT, for instance by receiving and decoding a C-AIT or by receiving a D-AIT using dedicated signaling.

In various embodiments, a piece of system information also includes a configuration or indication of measurement RS, for example the number of different measurement RS that are in use, the time/frequency resources used by the measurement RS, the measurement RS transmission period, the sequences or values used for measurement RSs, etc. In various embodiments, a measurement RS configuration is included in an AIT, for example in a C-AIT or a D-AIT. In various embodiments, a measurement RS configuration is included in a piece of system information that includes both a C-AIT and a measurement RS configuration, i.e. a measurement configuration is not included in the C-AIT. In various embodiments, a measurement RS configuration is included in a dedicated device configuration, e.g. by RRC signaling, that includes both a measurement RS configuration and a D-AIT, i.e. a measurement configuration is not included in the D-AIT.

An AIT contains multiple entries, each corresponding to an SSI. An AIT entry contains a random access configuration.

In various embodiments, a random access configuration contains multiple sets of allowed random access resources. In various embodiments, such sets of allowed random access resources are disjoint and in some embodiments they are overlapping, in various combinations.

In various embodiments, a random access configuration contains or indicates a random access mapping, e.g. from measurement results of measurement RS's to set(s) of allowed random access resources. Various embodiments of such mappings were described in earlier sections, including a mapping from one measurement RS to one set of allowed random access resources.

In various embodiments, a random access configuration includes an "unmapped" set of allowed random access resources, where "unmapped" means that the set is not selected based on a mapping from measurement result(s) on measurement RS(s), unlike the "mapped" sets of allowed random access resources described above. In various embodiments, devices may select a random access resource from an "unmapped" set of allowed random access resources if, for various reasons, it is more suitable than to select a random access resource from a "mapped" set. Such reasons may include, in various embodiments, that a measurement result based on measurement RS is not available or not reliable, for instance, due to:

Requirements for low latency, such that a random access resource needs to be selected and random access signal transmitted before a measurement result is obtained.

Measurement result is inaccurate.

Device is moving at high speed so measurement results may be outdated

In various embodiments, an "unmapped" set of allowed random access resources is defined by an overall (union of) set of allowed random access resources and the "mapped" sets of allowed random access resources. The "unmapped" set is then the resources in the overall set that are not included in any of the "mapped" sets.

In various embodiments, a random access configuration contains a configuration of a set of allowed random access resources and a measurement RS. In various embodiments, such a pair of a set and a measurement RS indicates a mapping in which a device should select the set of allowed random access resources if the measurement result, e.g., RSRP, for the measurement RS was the best (e.g. highest in the case of RSRP). In various embodiments, a random access configuration may include one or more such pairs of sets of allowed random access resources and measurement RSs. In various embodiments, a measurement RS configuration within such a pair contains a more detailed measurement RS configuration, according to various embodiments above. In various embodiments, a measurement RS configuration within such a pair contains an index of a measurement RS, which points to a more detailed measurement RS configuration elsewhere, for instance in a separate (e.g. common or device-dedicated) measurement RS configuration or a measurement RS table in a specification. In various embodiments, a measurement RS configuration within such a pair is a combination of a more detailed measurement RS configuration and an index pointing to a detailed configuration elsewhere.

Following the similar procedure 100 of FIG. 1, in some alternative embodiments wherein a synchronization signal includes an SSI, two procedures as described below may be respectively used by a device before performing a random access (i.e., the operations from 114-122).

In an embodiment, a device searches for one or more synchronization signals that include SSI's (similar to operation 102 of FIG. 1); the device detects one or more SSI's. Each detected SSI provides the device with a sync reference (similar to operation 104 of FIG. 1); the device performs measurements on one or more SSI's, wherein each different measurement is performed using the corresponding different SSI as sync reference (similar to operation 106 of FIG. 1); the device receives system information, including an AIT (similar to operation 108 of FIG. 1); the device decodes system information, including an AIT (similar to operation 110 of FIG. 1); the device selects an entry in the AIT based on the SSI measurement results, e.g., the entry corresponding to the index of the strongest measured SSI. (similar to operation 112 of FIG. 1) A random access configuration is included in the entry.

In another embodiment, the device may receive system information before performing SSI measurements. As such, the procedure may be used as follows: a device searches for one or more synchronization signals that include SSI's (similar to operation 102 of FIG. 1); the device detects one or more SSI's. Each detected SSI provides the device with a sync reference (similar to operation 104 of FIG. 1); the device receives system information, including an AIT; the device decodes system information, including an AIT; the device performs measurements on one or more SSI's, where each different measurement is performed using the corresponding different SSI as sync reference; The device selects an entry in the AIT based on the SSI measurement results, e.g., the entry corresponding to the index of the strongest measured SSI. A random access configuration is included in the entry.

The procedures described above are equivalent since the order between system information reception and measurement is arbitrary.

Various further device procedure embodiments are described below, which are based on embodiments described above where a random access configuration contains one or more sets of allowed random access resources and results from measurement RS measurements are used to select such a set.

In some embodiments, referring back to the operation 108 of FIG. 1, the device decodes system information, including an AIT and a measurement RS configuration. The device may immediately start measurements on measurement RS(s), with the SSI corresponding to the selected AIT entry used as sync reference. In some embodiments, referring back to the operation 110 of FIG. 1, the device decodes system information, including an AIT and a measurement RS configuration. The device may immediately start measurements on measurement RS(s), with the SSI corresponding to the selected AIT entry used as sync reference.

In some embodiments, referring back to the operation 112 of FIG. 1, the device selects an entry in the AIT based on the SSI measurement results, e.g. the entry corresponding to the index of the strongest measured SSI. A random access configuration is included in the entry. One or more sets of allowed random access resources are included in the entry, for instance in the random access configuration, according to various embodiments discussed above. In various embodiments, a measurement RS configuration is also included in the entry, for instance according to various embodiments discussed above. In various embodiments, for instance if a measurement RS configuration is included in system information, an entry does not include a measurement RS configuration. In various embodiments, if only one set of allowed random access resources are included in the entry, then the device may use that set directly and skip the following sub-steps, which aim at selecting a set from multiple sets. Furthermore, if there is an "unmapped" set of allowed random access resources, according to various embodiments above, then the device may choose to use the "unmapped" set directly.

In various embodiments, referring still to the operation 112 of FIG. 1, the device performs measurements based on measurement RS, with the SSI corresponding to the selected AIT entry used as sync reference. In some embodiments, such measurements were started already earlier, for instance if a measurement RS configuration was included in a system information. Measurement results based on measurement RS are obtained. A set of allowed random access resources is selected, based on a random access mapping, e.g., based on measurement results. Note that also an "unmapped" set may be selected in this step, according to various embodiments.

In other words, a device performs a first synchronization and measurement based on an SSI, which is similar to a first synchronization and measurement based on PSS/SSS/CRS in LTE. Then, a device performs a selection of an entry in an AIT based on the SSI measurement, which is similar to cell selection (and corresponding system information for the selected cell) based on PSS/SSS/CRS in LTE.

However, in various embodiments, a random access mapping, e.g., based on measurement RS measurements using the SSI corresponding to the selected AIT entry as sync reference, is used to select a set of allowed random access resources, from the one or more sets indicated in the random access configuration.

In various embodiments, the measurement RS's may be received immediately after the C-AIT, in order to facilitate a faster initial access procedure. In various embodiments, the measurement RS's may be received simultaneously or partly simultaneously as the C-AIT. In various embodiments, the measurement RSs may be received immediately before the C-AIT. In various embodiments, the measurement RS are configured with a transmission period equal to the C-AIT transmission period. In various embodiments, the measurement RS are configured with a transmission period an integer multiple times shorter than the C-AIT transmission period, for example 2, 4, 5, 8, 10 or 16 times smaller than the C-AIT transmission period.

Figure 8:
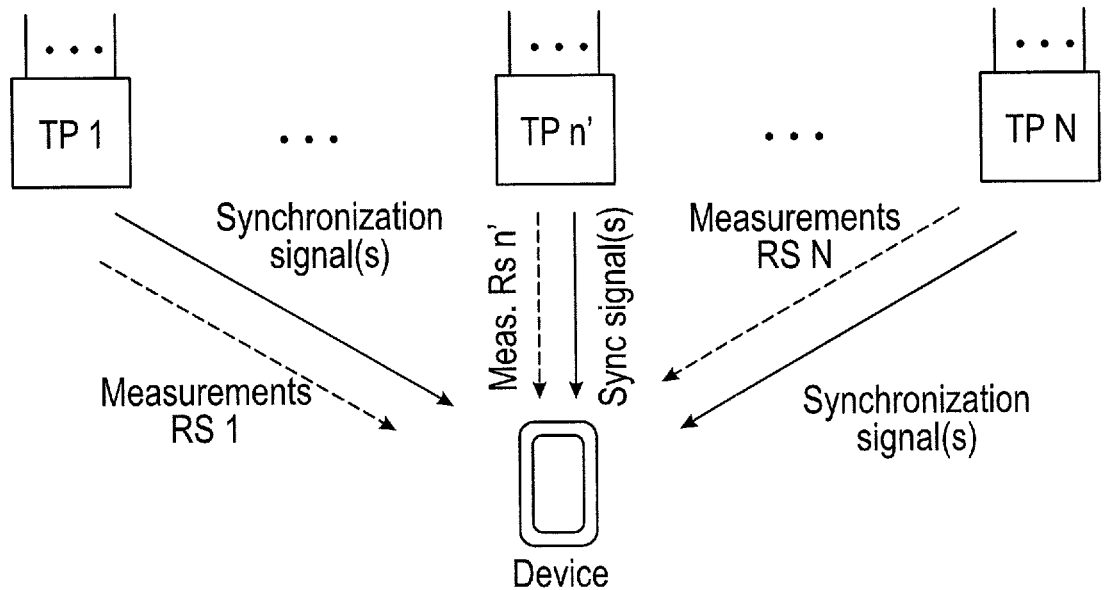
FIG. 8 illustrates an example in which a device is in a geographical area including plural synchronized TP's, in accordance with one embodiment of the invention.

FIG. 8 illustrates an example in which a device is in a geographic area including multiple synchronized TP's. In some embodiments, the device may try to establish a connection (e.g., random access) with at least one of the TP's. In the embodiment illustrated in FIG. 8, N different TP's transmit the same set of synchronization signal(s). In other embodiments, only a subset of the TP's transmit the synchronization signal(s). The device receives the synchronization signal(s) from different TP's superimposed on each other, possibly with minor individual time and/or frequency offsets. With sufficiently good combination of inter-TP synchronization, low mobility and small radio propagation distances, the device will perceive the signals from the multiple different TP as multipath components, that often also exist in a link between a single-TP and a device. Hence, the device cannot reliably deduce the number of synchronously transmitting TP's from the received synchronization signal(s) only in various embodiments.

The N TP's also transmit N different measurement RS. In some embodiments, one or more of the TP's each transmit multiple measurement RS's. In some embodiments, some measurement RSs are each transmitted by multiple TP's. In some embodiments, some TP's don't transmit any measurement RS.

In various embodiments, other sets of TP's also transmit synchronization signal(s) synchronously. In some embodiments, the transmission of some other sets of TP's are not mutually synchronized (between the sets), but only within each set, i.e., some other sets of TP's may be unsynchronized with the N TP's in the example.

In various embodiments, other sets of TP's also transmit synchronization signal(s) synchronously. In some embodiments, the transmission of some other sets of TP's are not mutually synchronized (between the sets), but only within each set, i.e. some other sets of TP's may be unsynchronized with the N TP's in the example. As described in various embodiments above, the device obtains a sync reference based on the synchronization signal(s) transmitted from the N TP's, or a subset of the N TP's in some embodiments. In some embodiments, the device obtains multiple different sync references based on different sets of unsynchronized TP's.

Using a sync reference, e.g. the sync reference obtained from the N TP's in this embodiment, the devices performs measurements on the measurement RS's and obtains measurement results, as described in various embodiments above.

Based on a random access mapping, the device obtains a set of allowed random access resources, as described in various embodiments above. In some embodiments, the set of allowed random access resources can be based on the measurement RS with highest RSRP. In some embodiments, the device transmits a random access signal on a random access resource from the set.

In some embodiments, TP's perform random access signal detection on all possible random access resources, i.e., the random access resources on which it can be expected that a device transmits a random access signal. In some embodiments, a TP performs random access signal detection on a subset of all possible random access resources. In some embodiments, a TP performs random access signal detection on the random access resources that correspond to measurement results such that the quality of the communication link between the TP and the device is sufficient. For example, a TP could perform random access signal detection on a set of allowed random access resources that a device selects if the measurement result on the measurement RS(s) from the TP is highest. In the example above and in various embodiments, this could correspond to that the link between TP n' (see FIG. 8) and the device is the best among the N links but it could correspond to other links in other embodiments.

In some embodiments, a TP performs random access signal detection on random access resources that a device would be allowed to use if the measurement results indicate that the TP is a promising candidate to be included in a Coordinated Multi-Point (CoMP) set for communication with the device. Examples of embodiments whereby a TP is a promising candidate for CoMP include but are not limited to:

The quality of the link between the TP and the device is close to the best link. For example, the RSRP from the TP is within a certain range from the highest RSRP.

The spatial properties of the link between the TP and the device is such that it fits well with the other TPs in the CoMP set. In some embodiments, the rank or condition number of the joint channel matrix between all or a subset of the TPs in the CoMP set is high. In other embodiments, the spatial correlation is low between the channels of the different TPs in the CoMP set and the device. A high rank or condition number may be favorable for multiple input multiple output (MIMO) communication. Low spatial correlation may be favorable for diversity, which may improve reliability. Note that high rank and low spatial correlation is fundamentally related.

In some embodiments, a TP performs random access signal detection on random access resources that a device would be allowed to select for certain services and/or performance requirements, if the TP supports such services and/or performance requirements. In some embodiments, a TP performs random access signal detection on random access resources that a device would use to request certain system information, if the TP is capable and/or assigned to provide such system information in the downlink.

As a TP detects a random access signal on a random access resource, it (and/or other entities in the wireless network) can deduce that the random access resource belonged to the set of allowed random access resources selected by the device, in various embodiments. In various embodiments, depending on the random access mappings, a TP (and the wireless network) can also make further deductions, for example about the measurement results, service requirements or other aspects taken into account in the random access mapping. In one embodiment, a TP (and the wireless network) can deduce that a measurement result for the measurement RS transmitted by the TP is the highest among the measurement results for the measurement RSs using the same sync reference.

In other words, a TP (and the wireless network) obtains certain knowledge immediately after a random access signal detection. In various state of the art and other wireless systems, this knowledge may not be available immediately after a random access signal detection, but is available much later, typically after first responding that the random access signal was successfully received and subsequently receiving further information from the device.

In various embodiments, other scheduled transmissions, i.e., other than random access signals, are scheduled for transmission on a set of allowed random access resources. In various embodiments, unscheduled other transmissions are transmitted on a set of allowed random access resources. Such scheduled or unscheduled transmissions include data, control and/or reference signal transmissions from devices, backhaul transmissions and fronthaul transmissions. In various embodiments, such transmissions are received (which could include received, processed, detected and/or decoded) by other TP(s) than the TP that performs random access signal detection on the set of allowed random access resources. Hence, the random access resources can be reused in network, improving the overall efficiency. This is sometimes called space division multiple access. In various embodiments, such transmissions are received (which could include received, processed, detected and/or decoded) by the same TP(s) that performs random access signal detection on the set of allowed random access resources. This could be achieved by using various forms of multiplexing of the transmissions, in various embodiments, for instance code multiplexing, spatial multiplexing using multiple receive antennas, etc. In this way, the random access resources can be further reused in the network.

Several benefits of the method in various embodiments are listed below. For example, Detection Delay By searching for random access signals on a smaller set of random access resources, the TP power consumption is reduced. Furthermore, for embodiments where there are multiple random access resources parallel in time, the time to detection (delay) can be reduced if only a subset of the parallel resources need to be searched.

Fast CoMP Setup

By immediately learning that a TPs has a good link to the device, TP sets for CoMP operation can be set up immediately. The set up could involve setting up backhaul links, resource coordination, security etc., in various embodiments. In some state of the art systems according to other embodiments, a CoMP set can be set up only after individual TPs have performed measurements on the detected random access signal, followed by a collection of the results at a node to perform a centralized CoMP set decision, or followed by a distributed CoMP set decision involving inter-TP information exchange. Both these approaches involve further time delays, which are avoided by using the method in this disclosure. This can improve the communication latency experienced by latency sensitive services and applications.

In various embodiments of fast CoMP setup, the random access mapping between measurement results (and corresponding measurement RSs) and one or more sets of allowed random access resources is such that each TP that subsequently detects one or more random access signals can immediately learn if it should be included in a CoMP set to serve the device that sent one or more random access signals. In some embodiments, this can be achieved by letting a TP search a smaller set of random access resources, where a random access signal transmitted on a random access resources from the smaller set means that the measurement results at the device are such that the TP should be included in a CoMP set.

Random Access Response Delay

A benefit that is related to fast CoMP setup is that a rapid random access response, shortly after a detected random access signal, is possible. A random access response is transmitted by the network, in response to a detected random access signal, for instance to indicate a successful reception and with further information in various embodiments. A low random access response delay is related to low overall communication delay, in some embodiments.

In some embodiments, such as illustrated in FIG. 8, different TPs transmit different measurement RS(s). In some such embodiments, a device maps the measurement RS(s) with highest measurement result to a set of allowed random access resources and such sets corresponding to different measurement RS are disjoint. In some embodiments, a TP could then search the set of allowed random access resources corresponding to the measurement RS(s) it transmits. If a random access signal is detected, the TP knows that the transmitting device has measured its measurement RS(s) with the highest result, e.g. highest RSRP. In some embodiments, it is suitable that the TP which transmitted the measurement RS(s) with highest measurement result also transmits the random access response. One reason could be that this can increase the likelihood that the random access response is successfully received by the device. Another reason could be that the random access response contains information, e.g. configuration information, about the subsequent communication with the device, and it is likely or suitable that the TP will perform the subsequent communication. In some embodiments where subsequent communication will involve CoMP, the TP with highest measurement result has the role of a master within the CoMP set, where other TPs in the set have slave roles.

In some embodiments with CoMP and master and slave TPs, a master TP searches the set(s) of allowed random access resources corresponding to favorable measurement results on measurement RS(s) transmitted by slave TP(s). In some such embodiments, the master TP also transmits a random access response, even though the measurement RS(s) from a slave TP had the highest measurement result. In some embodiments, a master TP decides if itself should rapidly respond to a detected random access signal, e.g., if it deduces that a low-latency service triggered the random access or if it's efficient from another perspective, or if transmission from one or more slave TPs, in some embodiments with CoMP, should be used for the random access response.

Cell-Less Handover of Idle Devices and Paging

In state-of-the-art and other cellular systems, idle devices keep track of (synchronize to, measure and obtain system information, etc.) nearby cells, which are often transmitted by different TPs. When the device needs to send uplink data, it performs the random access procedure according to the background section, i.e. directed towards a suitable cell (and the corresponding TP(s)), with the corresponding sync reference and set of allowed random access resources. Note that the set of allowed random access resources is favorably obtained from cell-specific system information, i.e., an idle device autonomously performs handover between different cells. One purpose with having an idle device direct the random access towards a suitable cell directly is that it may be efficient, in terms of required random access signal transmit power. Often, different adjacent cells coordinate their sets of allowed random access resources, in order to reduce the interference on the random access resources. In some embodiments, the sets of allowed random access resources are orthogonal (disjoint).

In some embodiments of this invention, idle devices keep track of multiple measurement RSs based on a sync reference, that are often transmitted by different TPs. When the device needs to send uplink data, it performs the random access procedure according to various embodiments of this invention, e.g. based on the measurement results and random access mapping to a set of allowed random access resources. With appropriate random access mapping, e.g. based on highest RSRP, a device directs the random access towards a suitable TP or sets of TP, according to various embodiments above, without the use of traditional cells. Avoiding the use of cells provides the benefit of reduced interference and increased energy efficiency in various embodiments. Note that the various embodiments of this invention also work in systems where traditional cells are used, or in systems where traditional cells are used to a lesser extent, for example where a single cell covers a larger area served by multiple TPs, but where different such larger areas may be covered by different cells.

Various embodiments of the invention also apply to measurement-based paging. Various embodiments extend the invention to include the concept of measurement-based paging configuration. In paging in general, the network needs to send downlink data to an idle device. This is done by sending a paging message to the device on certain paging resources. This keeps down the amount of resources an idle device needs to monitor. In the paging extension to this invention, a paging mapping is introduced. It is similar and analogous to various embodiments of the random access mapping. Based on the measurement results from multiple measurement RSs, a device obtains a set of paging resources, using the paging mapping in this application. A device monitors all or a sub-set of the paging resources for paging messages to the device. A measurement-based paging configuration allows for more flexible paging configurations in a network.

Various embodiments corresponding to the embodiments presented above are here applied to the embodiment of FIG. 8. In various such embodiments, a set of N TP's transmit the same synchronization signal SSI k. Other sets of TP's may transmit a different SSI. In various embodiments, a set of TPs that transmit the same SSI area are closely located geographically. Since the total number of different SSI's is limited, a network must typically contain multiple such sets of TP's that transmit the same SSI. In various embodiments, different such sets of TP's cover different geographical areas. In various embodiments, the sets of TP's that transmit different SSI's are not disjoint, but a TP may transmit multiple different SSI's. In various such embodiments, where a TP transmits multiple different SSI's, the different SSI's can correspond to different services or other parameters, for instance as specified in the corresponding entry in the AIT. In various such embodiments, where different SSI's can correspond to different services or other parameters, for instance as specified in the corresponding entry in the AIT, a TP may also transmit a single SSI.

As such, a nearby device selects the $k^{th}$ entry in the AIT, which contains a random access configuration. The random access configuration contains one or more sets of allowed random access resources, according to various embodiments described above. Furthermore, the N TP's transmit different measurement RS. In some embodiments, different nodes transmit the same measurement RS. Based on a random access mapping, according to various embodiments above, the device selects a set of allowed random access resources. If an "unmapped" set of allowed random access resources is used, according to various embodiments above, multiple or all N TP's may try to detect random access signals on that set.

It is often useful to be able to adapt the amount of random access resources. If there are too few random access resources in relation to the amount of random access attempts, the ratio of failed attempts might be too high. If there are too many random access resources in relation to the amount of random access attempts, then resources may be wasted, since other uplink transmissions might be avoided on the random access resources, resulting in reduced system performance.

In various systems including state-of-the-art systems such as LTE, the amount of random access resources can be adapted. The LTE UEs can learn which, and the amount of, random access resources that are currently in use, i.e. the set of allowed random access resources, by reading system information (SIB2), which can be received on the PDSCH.

The system and methods described in this disclosure allow adaptation of the random access resources without requiring the devices to obtain the current configuration of random access resources from system information. This is illustrated in FIGS. 9 and 10.

Figures 9A, 9B:
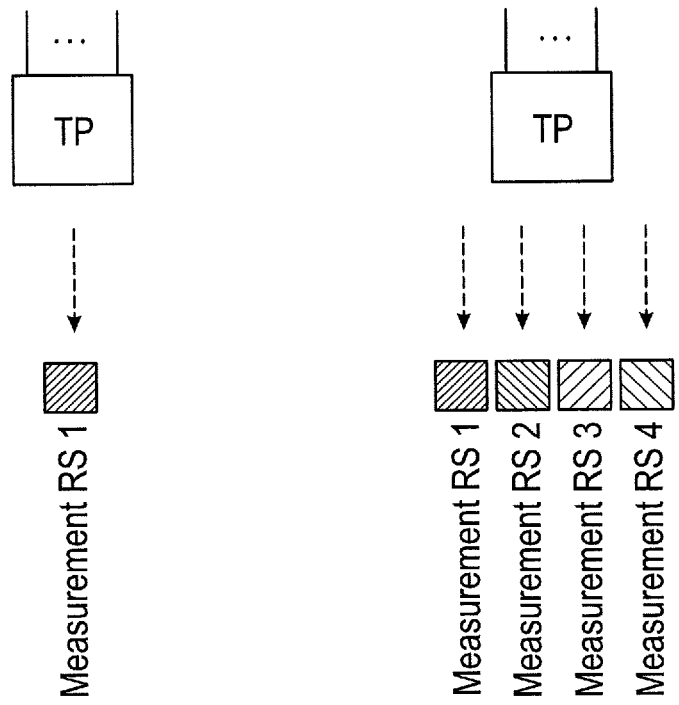
FIG. 9 illustrates two exemplary TP's that provide adaptive random access resources, respectively, in accordance with one embodiment of the invention.
Figure 10:
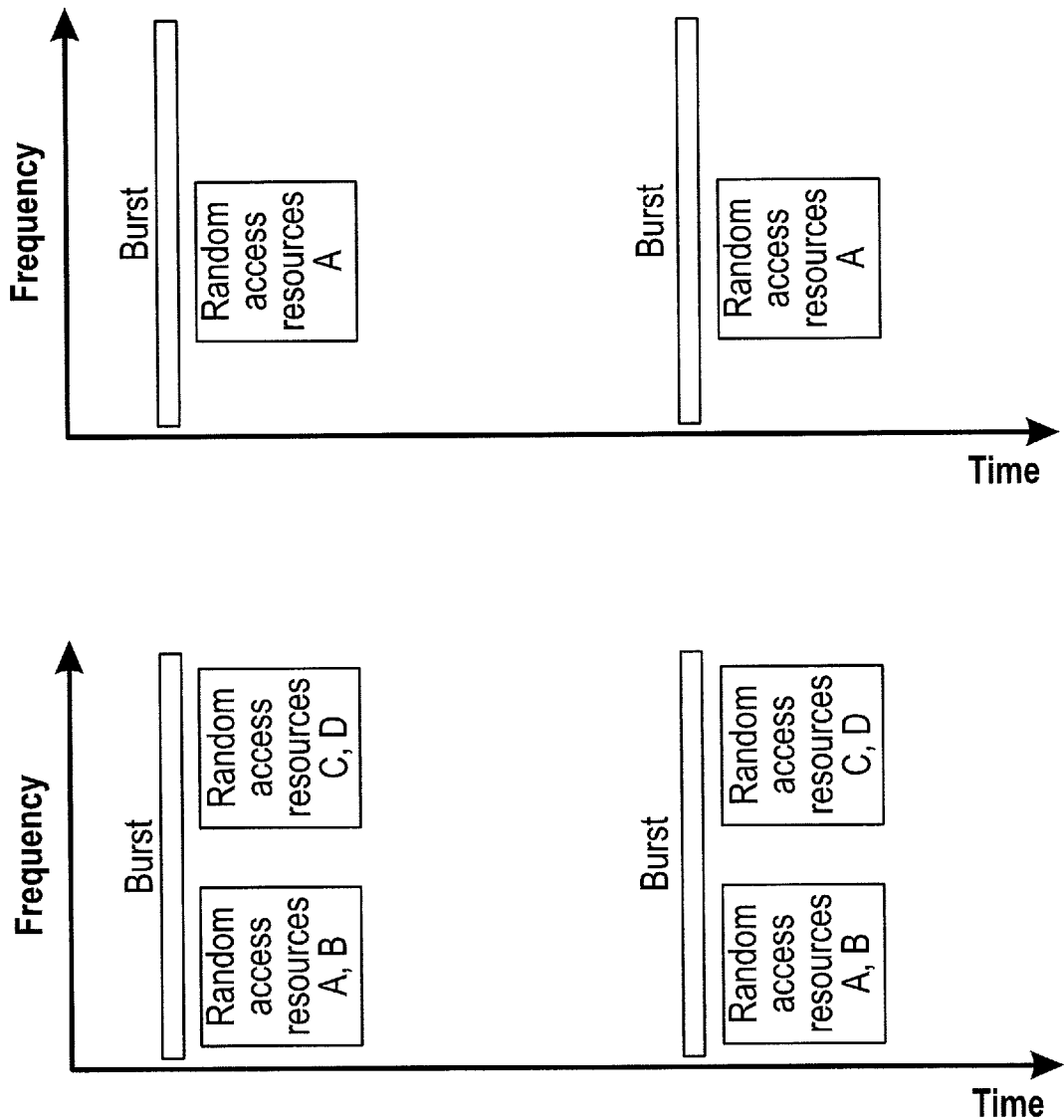
FIG. 10 illustrates exemplary set(s) of allowed random access resources of the two TP's FIG. 9, respectively, in accordance with one embodiment of the invention.

In FIG. 9(a), a single TP is considered in the example. In the example of FIG. 9(a), the TP transmits only measurement RS 1. Hence, any nearby device performing measurements on multiple measurement RS's (e.g. measurement RS 1-4) will find that the result of measurement RS 1 is the highest, and the device will consequently select the set of allowed random access resources A, as shown in FIG. 10(a). On the other hand, in the example of FIG. 9(b), the TP transmits four different measurement RS's with equal power. Hence, any device performing measurements on multiple measurement RS's will find that the result of one of the measurement RS's 1, 2, 3 or 4 is the highest, depending on for instance the instantaneous fading on the different resources used by the different measurement RS's, the additive noise, etc. Therefore, a device in the example of FIG. 9(b) will select set A, B, C or D. As a result of this scheme, in the example of FIG. 9(a), the TP may schedule other transmissions on the resources of sets B, C and D, since random access attempts on those resources are not expected. In the example of FIG. 9(b), on the other hand, random access attempts on A, B, C and D can be expected. Consequently, each of the random access resources is adapted accordingly by adjusting the transmission power of the measurement RS's, with zero transmission power resulting in that no devices (within the TP coverage area) will select the corresponding set of allowed random access resources. No update or reception of system information is necessary.

In various embodiments, a TP or cell adapts the transmit power of the measurement RS's. In some embodiments, the transmit power of some measurement RS's is set to zero. By adapting the measurement RS transmit powers, a TP can to some extent control the corresponding measurement results at the device side. For example, if the transmit power is set to zero on a first measurement RS and full transmit power is used on a second measurement RS, which is transmitted on a radio channel highly correlated with the radio channel of the first measurement RS, it is highly probable that the measurement result of the second measurement RS is higher than the measurement result of the first measurement RS.

In various embodiments, a TP or cell schedules non-random-access transmission, such as data transmissions, on random access resources that correspond (in the random access mapping) to strong measurement results of measurement RSs that were transmitted with low or zero power. In this manner, the amount of random access resources can be quickly adapted, without the need to update system information, without the need to notify devices of changed system information and without the need to wait for all devices to have received the updated system information. This can result in a more flexible, dynamic and efficient use of resources.

In some embodiments, a device is not required to receive and decode any system information before starting the random access procedure, since it can obtain the set of allowed random access resources from measurements results. In some embodiments, a device may start the random access procedure after receiving and decoding a smaller amount of system information, compared to state-of-the-art and other systems in which a set of allowed random access resources is also extracted from system information. A decreased amount of required system information, in some embodiments none, is used to initiate a random access procedure, e.g., to transmit a random access signal, and may result in lower communication delay. The delay in this embodiment can for example be between the time instant the device obtains synchronization and the time instant the device transmits a random access signal but other delays are used in other embodiments.

In various embodiments, one or more TP may use multiple transmit antennas to use beamforming. In transmit beamforming, the multiple antennas are used to focus the transmitted energy along a beam. In receive beamforming, the multiple antennas are used to focus the received energy along a beam. Benefits of the focusing of energy by transmit and receive beamforming are for example increased coverage and reduced interference.

Henceforth, multiple beams from a multi-antenna TP is considered, but the embodiments also apply to the case with multiple TPs with jointly have multiple antennas (i.e. some of the TPs may have a single antenna), where the multiple TPs are synchronized in various embodiments. The embodiments here are described in the context of multi-antenna TPs. However, the embodiments can also apply to cases with multi-antenna devices, relays, etc.

TP's with beamforming capabilities frequently have a set of possible beams that can be used. In some embodiments, sometimes called fixed beams or grid of beams, there is a smaller set of possible beams. In other cases, the set of possible beams is very large, for example, when the beamforming can be adapted by precoding and/or postcoding (also called equalization, receive filtering, combining) in the digital baseband. In other embodiments, the set of possible beams is a combination of a set of possible RF beams, i.e., beams generated in analog hardware (e.g. through phase shifts), and a set of possible digital beams (e.g. by digital precoding or postcoding). In systems with multiple possible beams, there may be an inherent problem to determine which beam from the set is most suitable for a particular device, or which beams that are suitable for a particular set of devices.

For the embodiment of receive beamforming with digital receive postcoding (equalization/filtering/combining) in the baseband, henceforth called digital receive beamforming, the beam selection is usually based on per-receive-antenna channel estimation. This means that the channel estimation is based on a signal that has not been receive beamformed. This is fine in many embodiments, but in other embodiments this results in insufficient channel estimation quality, in particular if the received signal is weak. If, instead, a suitable receiver beam would be known, the receiver could estimate the effective (lower-dimensional) channel after the receiver beamforming. It can be noted that in the digital receive beamforming embodiments, it is possible to try many different receive beamforming filters on the same received signal.

In some embodiments of analog (RF) receive beamforming (which in some cases is combined with digital receive beamforming), the beamforming cannot be selected or adapted after reception, such as with digital receive beamforming. Instead, only a single receive beamforming can be applied in each time instant, even though it may be changed with time. Hence, in various embodiments of systems with analog receive beam forming, it is useful to know a suitable receive beamforming for a particular device before the signal from the device is received.

For transmit beamforming including various combinations of analog (RF) beamforming and digital precoding in the baseband embodiments, the beamforming may be selected from (1) information fed back from the device or from (2) information extracted from signals received from the device. These two method embodiments are briefly described below.

RS and feedback: The TP transmits RS's which the device uses to identify which transmit beamforming (or equivalent information) that is suitable. The information, for example in the form a precoding matrix indicator (PMI) as in LTE, is fed back to the transmitter. This method is more common in FDD systems, which has lower correlation between the uplink and downlink channels.

UL-based: Based on one or more signals transmitted by a device and received by the TP, the TP can estimate which transmit beamforming is suitable. This method is more common in TDD systems, which has higher correlation between the uplink and downlink channels.

Another embodiment includes application of aspects of the disclosure to an embodiment that involves the legacy initial access procedure with a multi-antenna TP that uses transmit and/or receive beamforming, which was described above. Additional comments regarding the beamforming embodiment with respect to synchronization, measurement RSs and system information, are presented in the following embodiment to which aspects of the present disclosure are applied.

The TP transmits synchronization, measurement RS's and system information. Since synchronization and system information targets all devices (broadcast transmission), the transmission of those signals cannot use only a particular beam, since that would prohibit other devices for which the beam is not suitable, to receive the signals properly. Instead, in various embodiments, transmission without beamforming, e.g. from a single antenna or with a transmit diversity scheme, as in for PBCH in LTE, with more isotropic energy distribution can be used. In some embodiments, the signals can be transmitted on multiple, e.g. all, beams, simultaneously or consecutively in time. In this manner, the likelihood is improved that all devices within the coverage area can receive the signals with sufficient quality. Measurement RSs (such as CSI-RS in LTE) also may target multiple devices. However, it is usually not necessary that all measurement RSs are received with high quality at all those devices of interest. Instead, different measurement RS may be transmitted on different beams. Consequently, some measurement RSs are received with good quality (e.g. high RSRP) at a particular device, while other measurement RSs are received with poor quality (e.g. low RSRP).

Subsequently, the device obtains synchronization, performs measurements and receives system information. Then the device transmits a random access signal according to the configuration in the system information. For simplicity of description, beamforming in the device is not discussed here, but it should be understood that the various embodiments of this invention described herein, also apply to beamforming in the device. Also, beamforming in the device may be used together with aspects of the disclosed invention, using beamforming in the TP's. Beamforming need not be used either in the TP's or in the devices, but may also be used in both.

Accordingly, the TP receives and detects the random access signal. Due to the randomness of random access, the TP does not know beforehand which devices that choose to transmit random access signals on a certain random access resource and their corresponding suitable receive beamforming. Therefore, a TP cannot deliberately apply the suitable analog (RF) beamforming during the reception of a random access signal if not for the present disclosure. With digital receive beamforming of the disclosure, on the other hand, it is possible for a TP to apply multiple different receive beamformers to the received signal and perform detection on each of the receive beamformed signals, even though it increases the receiver complexity.

The TP responds with a random access response. After random access signal detection, a TP responds to the device. If the transmit beamforming is UL-based (see above), the TP may use the received random access signal to find a suitable transmit beamformer in various embodiments. However, due to the lack of high-quality, e.g. orthogonal, RS within a random access signal, low received signal energy, or other factors, it may be difficult for a TP to reliably compute a suitable transmit beamformer based on a single random access signal. If the transmit beamforming is based on RS and feedback (see above), the TP has not yet received such feedback. Typically, the TP does not even know the identity of the device which transmitted the detected random access signal. Furthermore, even if the TP would know the identity of the device, a random access attempt is typically preceded by a period of device inactivity (the device being idle), which means that last received feedback might not be valid (accurate) any more. In summary, it might often be difficult for a TP to apply a suitable transmit beamforming to the random access response if not for the present disclosure.

The device receives the random access response. If the TP does not apply a suitable transmit beamforming to the random access response as according to the present disclosure, the device might not successfully receive and decode the random access response. This could be a very severe drawback, since it would fundamentally limit the coverage of the TP. Even if a TP in principle could communicate with a distant device with functioning transmit and receive beamforming, it is not possible in practice since the initial access procedure cannot be successfully completed. The present invention addresses and solves this problem by indicating to the TP properties of the measurement results at the device of RS transmitted on different beams through the selection of random access resource.

Various embodiments above are applied to multi-beam TP(s). In some embodiments, a TP has multiple antennas and multi-beam capabilities. In some embodiments, multiple TP's jointly have multiple antennas and multi-beam capabilities. Multi-beam capabilities means that multiple transmit and/or receive beamformers can be selected and applied. The embodiments below are described in the context of a multi-beam TP, but are equally applicable to the case with multiple TP's having multi-beam capabilities.

In various embodiments, different measurement RS's may be transmitted on different beams. In some embodiments, some different measurement RS's are transmitted on the same beam. In some embodiments, the measurement RS's transmitted by a TP are transmitted on a set of beams such that the set of beams largely covers the TP coverage area. Stated alternatively, the geographical area within which devices can communicate with the TP, for example, using beamforming, is also covered by the measurement RS's that are transmitted on a set of beams from the TP. In some embodiments, measurement RS's that are transmitted on the set of beams are transmitted simultaneously. In some embodiments, some of those measurement RSs are transmitted in different time periods, i.e. they are time-multiplexed. This could mean that the transmit beams are time-multiplexed, in the context of measurement RS transmission, in various embodiments. In general, various properties and embodiments of measurement RSs' described earlier in the disclosure also may apply to measurement RS's in the context of multi-beam initial access.

Following the various embodiments of this invention, a device performs measurements on measurement RS's. Using a random access mapping, the device selects a set of allowed random access resources. From this set, the device selects a random access resource on which it transmits the random access signal. A TP detects the random access signal on the random access resource.

Figure 11:
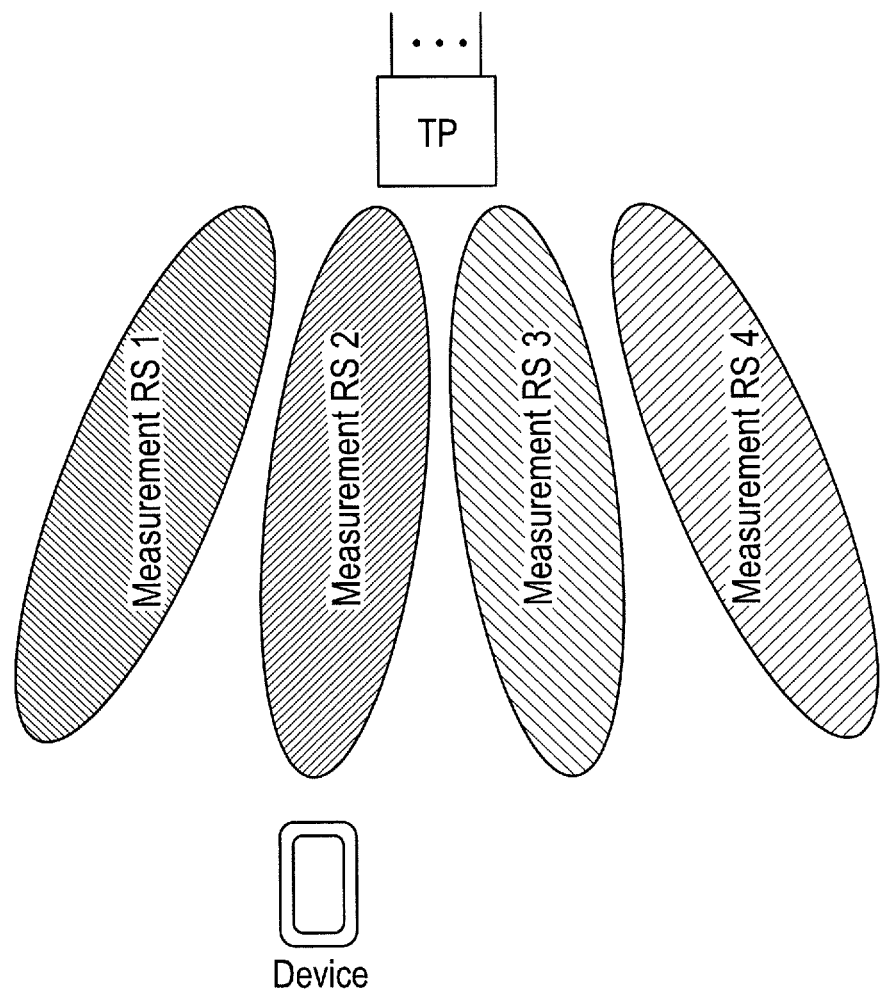
FIG. 11 illustrates an exemplary TP that transmits plural measurement RS's through one or more beamforming functions, in accordance with one embodiment of the invention.

With a suitable random access mapping, a TP (and/or the network) can deduce various properties of the device measurement results based on which random access resource the device selected, as also described in various embodiments above. For example, if the highest measured RSRP selects a set of allowed random access resources which is disjoint from the other sets, then a TP can deduce which measurement RS that had the highest RSRP based on in which random access resource a random access signal was detected. In the context of multi-beam initial access, a TP can deduce properties of the measurement results corresponding to the multiple beams used for the measurement RS's. In some embodiments, the TP can deduce which of the multiple beams that was measured with highest RSRP. As shown in FIG. 11, the TP detects a random access signal in random access resources B, and can then deduce that device measured the second beam, which carried measurement RS 2, with highest RSRP.

In various embodiments, synchronization signal(s) are transmitted on each of the transmit beams that transmit different measurement RS, similarly as in FIG. 8. This would improve the chances that a sync reference is available prior to measurements. In various embodiments, synchronization signal(s) are not transmitted on each of the transmit beams that transmit different measurement RS. Instead, synchronization signal(s) are transmitted on a subset of those beams, in some embodiments, or on other beams, in some embodiments, or a combination, in some embodiments. In some embodiments, synchronization signal(s) are transmitted on a transmit beam with wide main lobe, in some embodiments even isotropic or nearly isotropic, while measurement RSs are transmitted on transmit beams with more narrow main lobe. In some embodiments, synchronization signal(s) are transmitted from a single antenna, while measurement RS(s) are transmitted from multiple antennas using beamforming.

Below, the terms suitable receive beamforming and suitable transmit beamforming or transmit beam are used. Therefore, they are first clarified. A suitable receive beamforming is for example optimal or near-optimal in terms of SINR, SNR, SIR, bit error rate (BER), block error rate (BLER), or other measures, in various stages in a receiver with, for instance, linear, non-linear, iterative etc., receiver structure. A transmit beamforming may be deemed suitable for a device using the same measures as a suitable receive beamforming. However, the suitability of a transmit beamforming may furthermore take multiple devices into account, using the same measures. For example, a suitable transmit beamforming could be optimal in terms of average SINR among several devices, or in terms of minimum SINR among several devices. In some embodiments, there may be several suitable receive or transmit beams (beamformings). In such embodiments, each beam in which a measure (as above SINR etc.) is above a threshold, may be deemed suitable, whereby the threshold may be absolute or in relation to the highest measure (of the most suitable beam), in various embodiments.

In various embodiments, a TP can use the random access mapping properties to improve the efficiency and/or performance of random access signal detection. The reason is that the measurement results have certain properties for any device that uses a certain random access resource, due to the random access mapping from measurement results to random access resources. These measurement result properties correspond to how the transmit beams are received in the device, and the corresponding measurement results. In some embodiments, a random access resource is used only by devices which measured the highest RSRP on a certain measurement RS which was transmitted on a certain transmit beam. In various embodiments, properties of a receive beamforming (e.g. statistical properties, angular properties such as direction of arrival or main lobe, etc.) or even the explicit receive beamforming (e.g. receiver vectors, matrices, filter coefficients, phase shifts, amplitudes, etc.) that is suitable for a certain device can be deduced from which transmit beam(s) that are suitable. The determination of which transmit beam(s) are suitable, may be directly related to the measurement results for the different transmit beams. In some embodiments, the transmit beam for which a device measured the highest RSRP is a suitable transmit beam. In some embodiments, an angular direction, e.g. azimuth, of the mail lobe of the receive beamformer is selected to coincide with the angular direction of a deduced suitable transmit beam, e.g., the transmit beam with highest RSRP. Other embodiments of the meaning of a suitable transmit beamforming are discussed above. Therefore, in various embodiments, a TP can deduce which receive beamforming that is suitable in a certain random access resource. In the example where a certain random access resource is used only by devices which measured the highest RSRP on a certain transmit beam, a TP can therefore deduce that a certain receive beamforming is suitable for such a device. In other embodiments, a TP can deduce that a certain set or range of receive beamforming is suitable, or that certain properties of the receive beamforming are suitable. Note that such a deduction can be made even before a device transmits a random access signal on the random access resource in various embodiments. Further note that in various embodiments, in particular in FDD systems, a suitable receive beamforming cannot be reliably deduced from which transmit beam(s) that are suitable.

In various embodiments with digital receive beamforming, where a TP may use multiple different digital receive beamforming to consecutively or in parallel perform random access signal detection (on the same received signal), a TP may choose to use only a reduced set of digital receive beamformers based on the deductions on suitable receive beamforming described above. In some embodiments, a TP may choose to use only a single digital receive beamforming. Benefits of choosing a reduced set of or even a single digital receive beamformer include reduced complexity and therefore also reduced cost and energy consumption. In some embodiments, a further benefit is reduced detection time, for example when detections with different digital receive beamformers are performed consecutively. Note that the reduction above is in relation to a full set of digital receive beamformers that are required to cover any device that should be able to access the TP, without any prior knowledge about which receive beamforming that is suitable for a device that is about to attempt initial access. Further note that various embodiments of the disclosure include multiple different digital receive beamforming which are possible because it is a post-processing operation on a digital signal that is stored in a memory.

In various embodiments with analog (RF) receive beamforming, a TP may not use multiple different analog receive beamforming on the same received signal, since there is a single set of receiver hardware and the analog receive beamforming is a real-time operation on the actual analog signal. Instead, at a given time instant, only a single analog receive beamforming configuration is possible in this embodiment. Such a configuration can be given by relative phase shifts in the combination of different receive antennas or groups of receive antennas, and corresponding amplification factors, in various embodiments. In various embodiments, it is possible to reconfigure the analog receive beamforming dynamically, i.e. "on the fly". In various embodiments, the invention can help to improve the coverage in which a TP can detect random access signals. Without using the invention, the random access signal detection might become the coverage bottleneck. Following the reasoning for digital receive beamforming, a TP can deduce a suitable receive beamformer for a certain random access resource. Hence, by using an appropriate random access mapping that lets devices that likely have similar suitable receive beamforming, in some embodiments, or similar suitable analog receive beamforming, in some embodiments (such as with hybrid beamforming), select sets of allowed random access resources overlap, completely or partially, in time. Hence, a TP may in a certain time period choose the corresponding receive beamforming, in some embodiments, or the corresponding analog receive beamforming, in some embodiments, that is likely suitable for a device that chooses a random access resource in the time period and transmits a random access signal therein.

Following the reasoning about improved random access signal detection above, aspects of the disclosure also provide for the communication efficiency of the random access response to be improved. According to this embodiment, from the random access resource on which a random access signal was detected, a TP can deduce certain properties of the measurement results on the measurement RS, which were transmitted on different transmit beams, in the device that transmitted the random access signal. According to one embodiment, if a random access signal was detected on a certain random access resource, the TP can deduce that the measured RSRP was highest on a certain transmit beam. Therefore, a suitable transmit beamforming for the random access response can be found. For example, the transmit beamforming that resulted in the highest RSRP can be used also for the random access response. In other embodiments, a transmit beamforming that is similar to the beam with highest RSRP is used (with similarity being for example high inner product magnitude, similar main lobe angles, etc). In a system with hybrid beamforming, for example, the analog transmit beamforming might have changed between the time of measurement at the device and the time of random access response transmission. Therefore, without the application of the present invention, it might not be possible to use exactly the same transmit beamforming, if the set of possible digital beamformers is limited.

By using the method and system described in this invention, the communication efficiency of the random access response can be greatly improved. In various embodiments, the coverage of the random access response can be significantly improved, since a suitable transmit beamforming can selected. A TP can select a suitable transmit beamforming for the random access response in various embodiments, even if the random access signal itself (or other reference signals transmitted by the device) cannot be used to deduce a suitable transmit beamforming, such as in various FDD systems. In such embodiments, a TP relies on RS measurements and feedback from a device to learn which transmit beamforming is suitable. In the case of initial access, however, devices have not yet had a chance to feed back any such information if not for aspects provided by the presented disclosure. Instead, the disclosed invention provides the advantage of a TP with the means to select a suitable transmit beamforming for a device, without the need for explicit feedback. A TP may deduce a suitable transmit beamforming by the random access resource that was used by the detected random access signal, and the corresponding random access mapping.

In various embodiments, other scheduled transmissions, i.e., other than random access signals, are scheduled for transmission on a set of allowed random access resources. In various embodiments, unscheduled other transmissions are transmitted on a set of allowed random access resources. Such scheduled or unscheduled transmissions include data, control and/or reference signal transmissions from devices, backhaul transmissions and fronthaul transmissions. In various embodiments, such transmissions are received (which could include received, processed, detected and/or decoded) by the same TP(s) that performs random access signal detection on the set of allowed random access resources. For instance, a TP performs random access signal detection on random access resources A using "beam 1." If a "beam X" is orthogonal or near-orthogonal to beam 1, then another transmission where the received signal at the TP is aligned with beam X would result in no or small interference to the random access signal detection using beam 1. In this way, the random access resources can be reused by a TP and in the network, improving overall efficiency Various embodiments presented above are here applied to the embodiment with respect to the multi-antenna TP (e.g., FIG. 11). In various such embodiments, a multi-antenna TP transmits a synchronization signal SSI k, for instance using an omni-directional beam or using a large set of beams simultaneously, as discussed above, in various embodiments. Hence, a nearby device selects the $k^{th}$ entry in the AIT, which contains a random access configuration. The random access configuration contains one or more sets of allowed random access resources, according to various embodiments described above. Furthermore, the TP transmits multiple different measurement RS, using different beams, as proposed in various embodiments above. Based on a random access mapping, according to various embodiments above, the device selects a set of allowed random access resources.

If an "unmapped" set of allowed random access resources is used, according to various embodiments above, a TP may try to detect random access signals on that set using an omni-directional beam, or multiple different beams.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Although functions described herein are described in the context of Open System Interconnect (OSI) model layers, one of ordinary skill in the art will recognize that the functions described herein can be performed by one or more processors contained in the UE, the device, the TP(s), or in a base station in the case of corresponding base station functions. Thus, one or more of the functions described in this document may be performed by an appropriately configured processor. In accordance with various embodiments, the processor may be implemented as a single integrated circuit (IC) or as multiple communicatively coupled IC's and/or discrete circuits. It is appreciated that the processor can be implemented in accordance with various known technologies. In one embodiment, the processor includes one or more circuits or units configurable to perform one or more functions or processes described herein by executing instructions stored in an associated memory, for example. In other embodiments, the processor may be implemented as firmware (e.g., discrete logic components) configured to perform one or more functions or processes described herein. For example, in accordance with various embodiments, the processor may include one or more controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional layers or modules. However, it will be apparent that any suitable distribution of functionality between different functional units, processors or domains may be used without departing from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments but instead be given the scope commensurate with the plain and ordinary meaning of the claims.

What is claimed is:

1. A method for a device to communicate with one or more transmission points (TPs), comprising:
receiving a plurality of reference signals;
performing a plurality of measurements on the plurality of reference signals;
selecting a first reference signal with a measurement result above a threshold from the plurality of reference signals based on the plurality of measurements,
wherein the threshold is configured by a first communication system and received by the device during a handover procedure, wherein a connection between the device and the first communication system is transferred during the handover procedure to another connection between the device and a second communication system that is different from the first communication system;
receiving a signal that includes configuration information indicating a mapping between a set of allowed random access resources and the first reference signal,
wherein the configuration information indicating the mapping is configured by the first communication system and received by the device during the handover procedure; and
selecting a random access resource from the set of allowed random access resources based on the mapping for transmitting a random access signal to at least one of the one or more TPs.

2. The method of claim 1, wherein the plurality of reference signals corresponds to different sets of allowed random access resources that overlap in part.

3. The method of claim 1, wherein the plurality of reference signals corresponds to different sets of allowed random access resources that are disjointed.

4. The method of claim 1, wherein the set of allowed random access resources is indicated from the one or more TPs to the device.

5. The method of claim 1, wherein the selecting the random access resource comprises choosing the random access resource correspondent with the first reference signal that has a highest transmission power among the plurality of reference signals.

6. The method of claim 1, wherein the selecting the random access resource comprises choosing the random access resource correspondent with the first reference signal that has a highest expected spectral efficiency among the plurality of reference signals.

7. The method of claim 1, wherein the threshold is received from broadcasted system information.

8. A method for one or more transmission points (TPs) to communicate with a device, comprising:
sending a plurality of reference signals to the device, wherein the plurality of reference signals are configured for the device to perform a plurality of measurements;
sending a signal that includes configuration information indicating a mapping between a set of allowed random access resources and a first reference signal from the plurality of reference signals,
wherein the first reference signal provides a first measurement result obtained from the plurality of measurements and the first measurement result is above a threshold,
wherein the threshold is configured by a first communication system and received by the device during a handover procedure, wherein a connection between the device and the first communication system is transferred during the handover procedure to another connection between the device and a second communication system that is different from the first communication system,
wherein the configuration information indicating the mapping is configured by the first communication system and received by the device during the handover procedure; and
receiving a random access signal from the device on a random access resource selected based on the mapping, by the device, from the set of allowed random access resources.

9. The method of claim 8, wherein the plurality of reference signals corresponds to different sets of allowed random access resources that are disjoint or overlap in part.

10. The method of claim 8, wherein the set of allowed random access resources is indicated from the one or more TPs to the device.

11. A transmission point (TP), comprising:
a transceiver configured to:
send a plurality of reference signals to a device, wherein the plurality of reference signals are configured for the device to perform a plurality of measurements,
send a signal that includes configuration information indicating a mapping between a set of allowed random access resources and a first reference signal from the plurality of reference signals,
wherein the first reference signal provides a first measurement result obtained from the plurality of measurements and the first measurement result is above a threshold,
wherein the threshold is configured by a first communication system and received by the device during a handover procedure, wherein a connection between the device and the first communication system is transferred during the handover procedure to another connection between the device and a second communication system that is different from the first communication system,
wherein the configuration information indicating the mapping is configured by the first communication system and received by the device during the handover procedure, and
receive a random access signal from the device on a random access resource selected based on the mapping, by the device, from the set of allowed random access resources.

12. The TP of claim 11, wherein the set of allowed random access resources is indicated from the TP to the device.

13. A device, comprising:
a receiver configured to:
receive a plurality of reference signals; and
at least one processor configured to:
perform a plurality of measurements on the plurality of reference signals, and select a first reference signal with a measurement result above a threshold from the plurality of reference signals based on the plurality of measurements, wherein the threshold is configured by a first communication system and received by the device during a handover procedure, wherein a connection between the device and the first communication system is transferred during the handover procedure to another connection between the device and a second communication system that is different from the first communication system, wherein the receiver is further configured to:
receive a signal that includes configuration information indicating a mapping between a set of allowed random access resources and the first reference signal, wherein the configuration information indicating the mapping is configured by the first communication system and received by the device during the handover procedure, and wherein the at least one processor is further configured to:
select a random access resource from the set of allowed random access resources based on the mapping for transmitting a random access signal to at least one TP.

14. The device of claim 13, wherein the set of allowed random access resources is indicated from the at least one TP to the device.

* * * * *